(12) United States Patent
Hansen et al.

(10) Patent No.: US 7,229,281 B2
(45) Date of Patent: Jun. 12, 2007

(54) METHOD OF MIXING HIGH TEMPERATURE GASES IN MINERAL PROCESSING KILNS

(75) Inventors: Eric R. Hansen, Shawnee, KS (US); Ralph A. Supelak, Strongsville, OH (US); James R. Tutt, Texarkana, TX (US)

(73) Assignees: Cadence Environmental Energy, Inc., Michigan City, IN (US); Ash Grove Cement Company, Overland Park, KS (US)

( * ) Notice: Subject to any disclaimer, the term of this patent is extended or adjusted under 35 U.S.C. 154(b) by 0 days.

(21) Appl. No.: 11/137,288

(22) Filed: May 25, 2005

(65) Prior Publication Data

US 2005/0277081 A1    Dec. 15, 2005

Related U.S. Application Data

(63) Continuation-in-part of application No. 10/719,423, filed on Nov. 21, 2003, which is a continuation of application No. 09/951,164, filed on Sep. 11, 2001, now Pat. No. 6,672,865.

(60) Provisional application No. 60/276,355, filed on Mar. 16, 2001, provisional application No. 60/251,129, filed on Dec. 4, 2000, provisional application No. 60/231,663, filed on Sep. 11, 2000.

(51) Int. Cl.
*F27B 7/14* (2006.01)

(52) U.S. Cl. .................. 432/118; 432/105; 432/117; 106/758

(58) Field of Classification Search .......... 432/113, 432/117, 105, 118, 58, 106; 106/758, 761, 106/762, 752
See application file for complete search history.

(56) References Cited

U.S. PATENT DOCUMENTS

| 3,488,700 | A | | 1/1970 | Dieter et al. |
| 3,584,650 | A | | 6/1971 | Brandvold et al. |
| 4,273,314 | A | * | 6/1981 | Keran et al. ................. 266/145 |
| 4,329,180 | A | | 5/1982 | Herchenbach et al. |
| 4,850,290 | A | | 7/1989 | Benoit et al. |
| 4,930,965 | A | | 6/1990 | Peterson et al. |
| 4,974,529 | A | | 12/1990 | Benoit et al. |
| 4,984,983 | A | | 1/1991 | Enkegaard |

(Continued)

FOREIGN PATENT DOCUMENTS

DE    196 41 207 A1    3/1997

(Continued)

OTHER PUBLICATIONS

Engineering drawings for air injection system for kiln installed in Obourg, Belgium, Jun. 1997.

(Continued)

*Primary Examiner*—Gregory Wilson
(74) *Attorney, Agent, or Firm*—Barnes & Thornburg LLP

(57) ABSTRACT

A method is described for reducing $NO_x$ emissions and improving energy efficiency during mineral processing in a rotary kiln. The method comprises injection of air with high velocity/high kinetic energy into the kiln to reduce or eliminate stratification of kiln gases. The method can be applied to mix gases in a rotary kiln vessel or in a preheater/precalciner vessel.

17 Claims, 24 Drawing Sheets

U.S. PATENT DOCUMENTS

| | | |
|---|---|---|
| 5,078,594 A | 1/1992 | Tutt et al. |
| 5,083,516 A | 1/1992 | Benoit et al. |
| 5,086,716 A | 2/1992 | Lafser, Jr. |
| 5,122,189 A | 6/1992 | Garrett et al. |
| 5,224,433 A | 7/1993 | Benoit et al. |
| 5,257,586 A | 11/1993 | Davenport |
| 5,339,751 A | 8/1994 | Tutt |
| 5,375,535 A | 12/1994 | Tutt |
| 5,413,476 A | 5/1995 | Baukal et al. |
| 5,451,255 A | 9/1995 | Hansen et al. |
| 5,454,715 A | 10/1995 | Hansen et al. |
| 5,569,030 A | 10/1996 | Hansen et al. |
| 5,632,616 A | 5/1997 | Tutt et al. |
| 5,989,017 A | 11/1999 | Evans |
| 6,000,937 A | 12/1999 | Schilling et al. |
| 6,050,813 A | 4/2000 | Doumet |
| 6,210,154 B1 | 4/2001 | Evans et al. |
| 6,213,764 B1 | 4/2001 | Evans |
| 6,257,877 B1 | 7/2001 | Hundebol |
| 6,309,211 B1 * | 10/2001 | Dock et al. ................. 432/119 |
| 6,474,984 B2 | 11/2002 | Gardner |
| 6,672,865 B2 | 1/2004 | Hansen et al. |

FOREIGN PATENT DOCUMENTS

| | | |
|---|---|---|
| EP | 0 803 693 A2 | 10/1997 |
| JP | 2000130744 | 5/2000 |

OTHER PUBLICATIONS

"Nox Reduction and Destruction," Craig Wahlquist, *World Cement* Oct. 2000, pp. 1-3.

International Search Report dated Oct. 2, 2006, 2 pages.

* cited by examiner

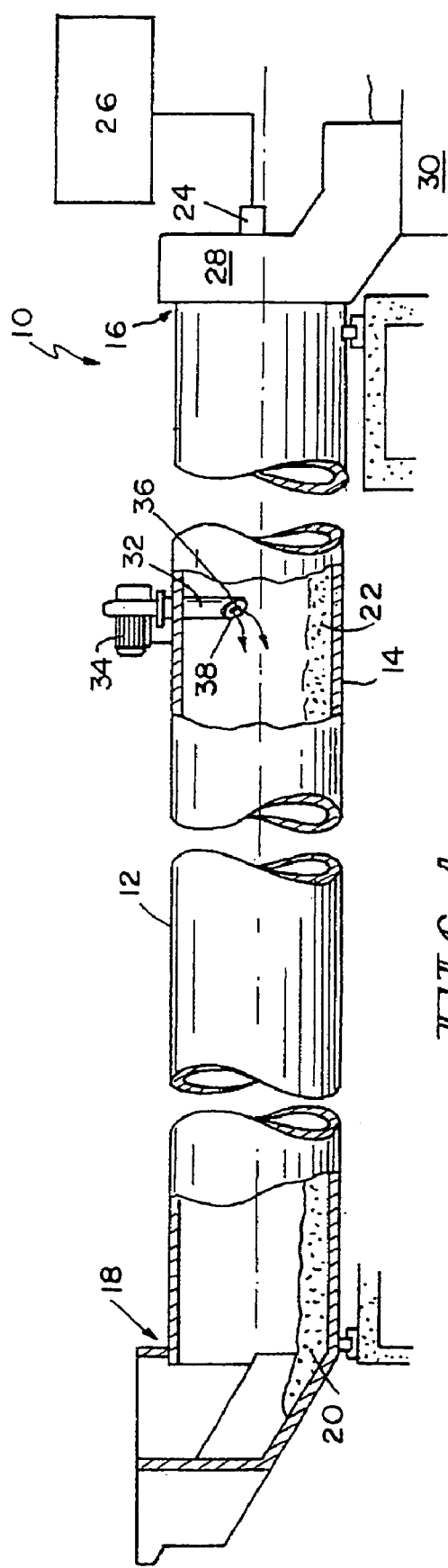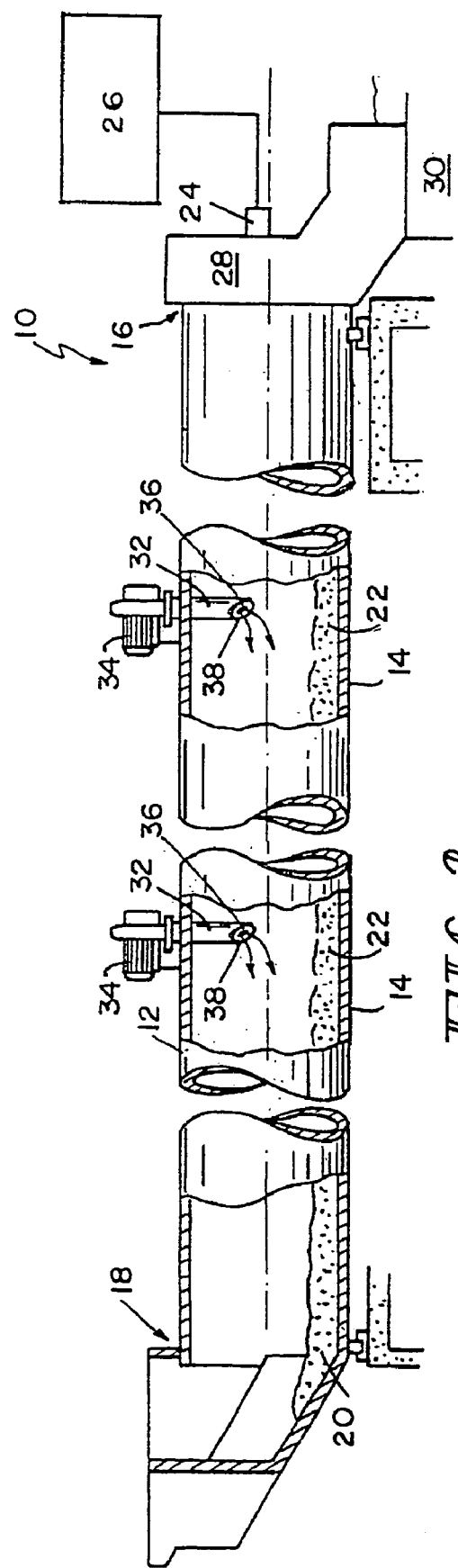

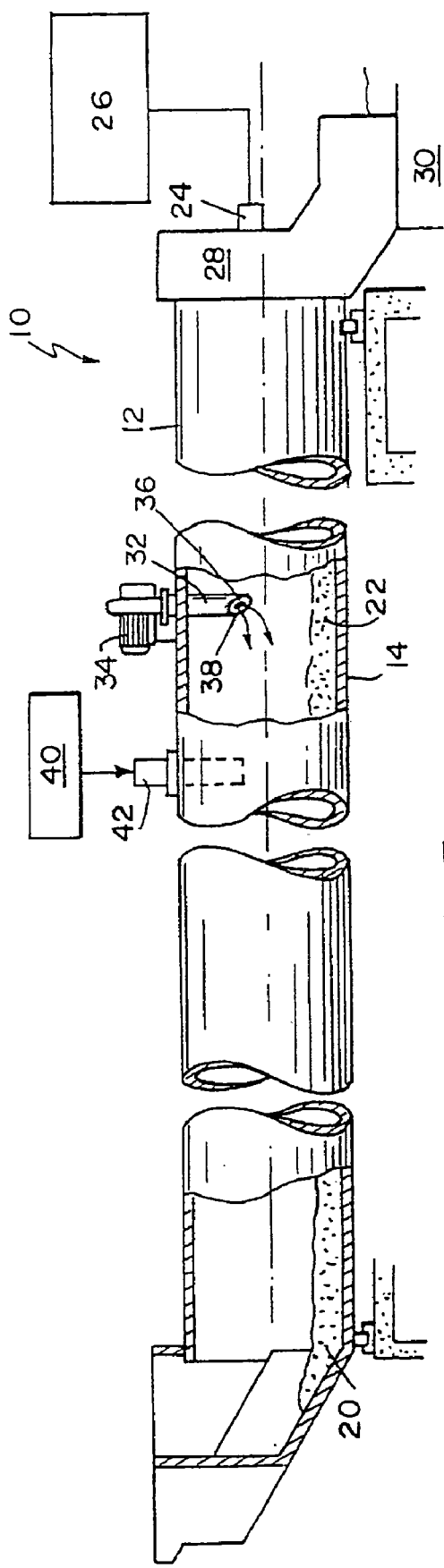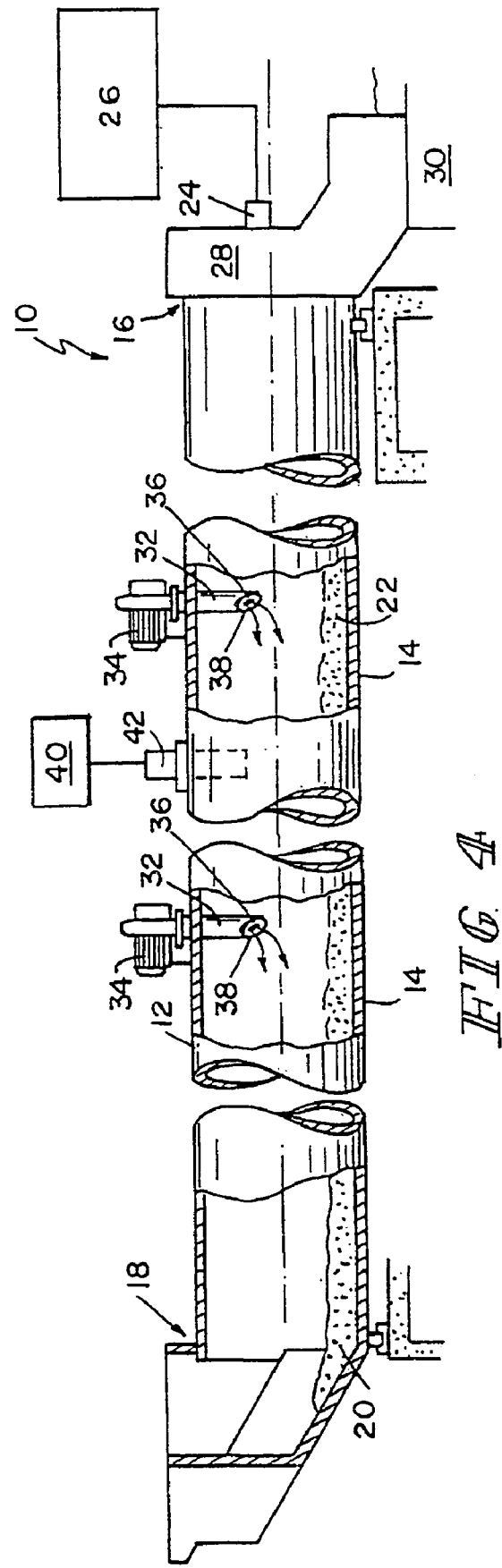

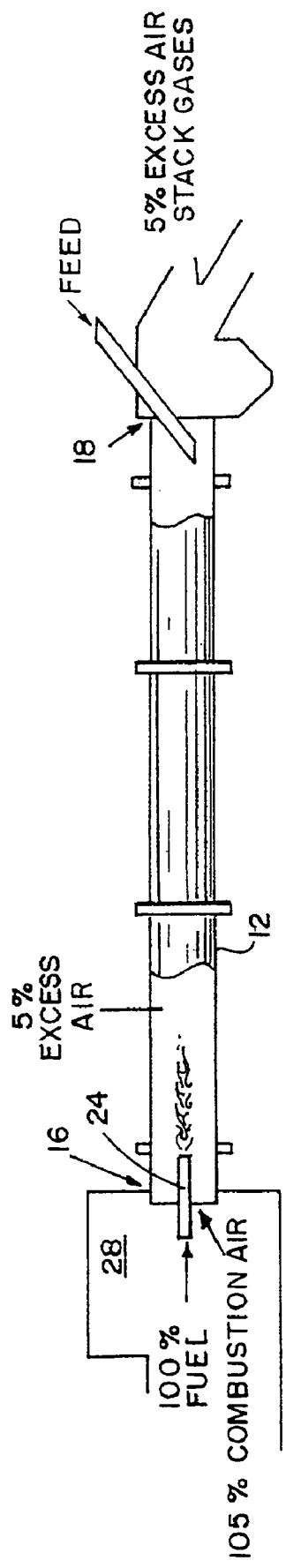
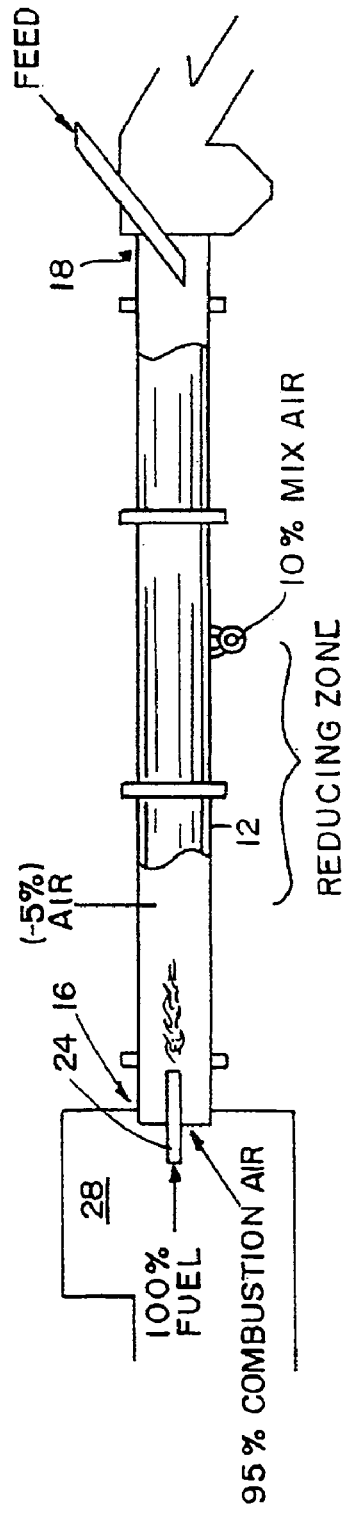
FIG. 10a
FIG. 10b

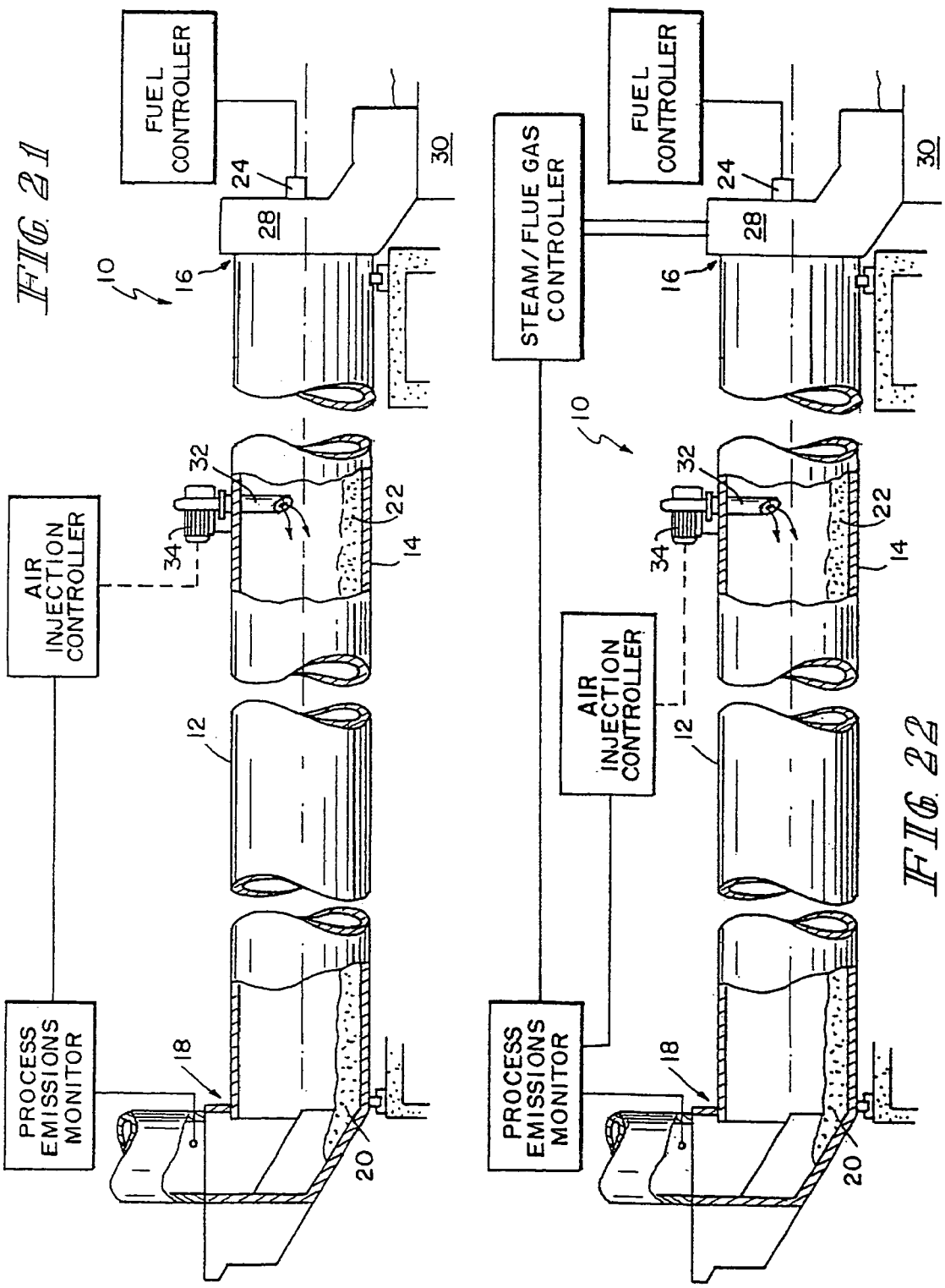

METHOD OF MIXING HIGH TEMPERATURE GASES IN MINERAL PROCESSING KILNS

CROSS-REFERENCE TO RELATED APPLICATIONS

This application is a continuation-in-part of co-pending U.S. Non-Provisional application Ser. No. 10/719,423, filed Nov. 21, 2003 which is a continuation of U.S. Pat. No. 09/951,164 now U.S. Pat. No. 6,672,865, filed on Sep. 11, 2001 which claims priority to U.S. Provisional Application Ser. No. 60/231,663, filed Sep. 11, 2000, U.S. Provisional Application Ser. No. 60/251,129, filed Dec. 4, 2000 and U.S. Provisional Application Ser. No. 60/276,355, filed Mar. 16, 2001. Each of these applications and the patent are hereby incorporated by reference.

FIELD OF THE INVENTION

This invention relates to method and apparatus for the improved operation efficiency and reduced emissions from mineral processing kilns and in particular those kilns wherein the processed mineral liberates gas during thermal processing. More particularly the invention is directed to the injection of high velocity/high momentum air into the kiln gas stream to mix gas stream components and dissipate the released gases blanketing the mineral bed allowing for more efficient heat transfer to in-process the mineral and concomitantly to reduce pollutants in the kiln gas effluent stream.

BACKGROUND AND SUMMARY OF THE INVENTION

In the widely used commercial process for the manufacture of cement, the steps of drying, calcining, and clinkering cement raw materials are accomplished by passing finely divided raw materials, including calcareous minerals, silica and alumina, through a heated, inclined rotary vessel or kiln. In what is known as conventional long dry or wet process kilns the entire mineral heating process is conducted in a heated rotating kiln cylinder, commonly referred to as a "rotary vessel." The rotary vessel is typically 10 to 15 feet in diameter and 200–700 feet in length and is inclined so that as the vessel is rotated, raw materials fed into the upper end of the kiln cylinder move under the influence of gravity toward the lower "fired" end where the final clinkering process takes place and where the product cement clinker is discharged for cooling and subsequent processing. Kiln gas temperatures in the fired clinkering zone of the kiln range from about 1300° C. (~2400° F.) to about 2200° C. (~4000° F.). Kiln gas exit temperatures are as low as about 250° C. (~400° F.) to 350° C. (~650° F.) at the upper mineral receiving end of so-called wet process kilns. Up to 1100° C. (~2000° F.) kiln gas temperatures exist in the upper end of dry process rotary kilns.

Generally, skilled practitioners consider the cement making process within the rotary kiln to occur in several stages as the raw material flows from the cooler gas exit mineral feed end to the fired/clinker exit lower end of the rotary kiln vessel. As the mineral material moves down the length of the kiln it is subjected to increasing kiln gas temperatures. Thus in the upper portion of the kiln cylinder where the kiln gas temperatures are the lowest, the in-process mineral materials first undergo a drying/preheating process and thereafter move down the kiln cylinder until the temperature is raised to calcining temperature. The length of the kiln where the mineral is undergoing a calcining process (releasing carbon dioxide) is designated the calcining zone. The in-process mineral finally moves down the kiln into a zone where gas temperatures are the hottest, the clinkering zone at the fired lower end of the kiln cylinder. The kiln gas stream flows counter to the flow of in-process mineral materials from the clinkering zone, through the intermediate calcining zone and the mineral drying/preheating zone and out the upper gas exit end of the kiln into a kiln dust collection system. The flow of kiln gases through the kiln can be controlled to some extent by a draft induction fan positioned in the kiln gas exhaust stream. Over the last 10–20 years preheater/precalciner cement kilns have proven most significantly more energy efficient than the traditional long kilns. In precalciner kilns the raw mineral feed is heated to calcining temperatures in a stationary counterflow precalciner vessel before it drops into a heated rotary vessel for the higher temperature clinkering reactions.

Responsive to environmental concerns and more rigorous regulating of emission standards, the mineral processing industry has invested in a significant research and development effort to reduce emissions from cement and other mineral processing kilns. The present invention provides a method and apparatus for improving thermal efficiency and reducing emission of gaseous pollutants during the manufacture of thermally processed mineral products such as cement and limestone. The invention finds application to both so-called long mineral processing kilns and, in the case of cement manufacture, precalciner kilns, already recognized for their energy efficient production of cement clinker. The invention provides advantage in the form of reduced emissions and enhanced energy efficiency in supplemental fuels, the thermal processing of gas releasing minerals including, but not limited to, talconite, limestone, cement raw materials, and clays for the production of light weight aggregates.

In one aspect of the invention high energy/velocity air is injected into the kiln gas stream to reduce or eliminate stratification of gases in a kiln during thermal processing of a mineral that liberates a gas as it is processed.

In another aspect of this invention kiln gas mixing energy is delivered to the kiln gas stream by injecting air at high velocity into rotary kilns in a manner designed to impart rotational momentum to the kiln gases in the rotary vessel. It has been found that injection of high velocity air to promote cross-sectional mixing in mineral processing kilns works to improve energy efficiency by facilitating energy transfer to the mineral bed, and concomitantly such air injection alters the stoichiometry and temperature profile of combustion in the primary combustion zone to reduce the formation of byproduct nitrogen oxides.

According to one aspect of the present invention, there is provided a method for reducing $NO_x$ emissions and improving energy efficiency during mineral processing in a rotary kiln. The kiln comprises an inclined rotary vessel having a primary burner and a combustion air inlet at its lower end and an upper end for introducing raw mineral feed. The method finds particular use wherein the mineral in a mineral bed in the rotary vessel undergoes a gas releasing chemical reaction during thermal processing in the kiln. The method comprises the step of injecting air into the rotary vessel at a velocity of about 100 to about 1000 feet per second, typically from an air pressurizing source providing a static pressure of greater than about 0.15 atmospheres, and in one aspect of the invention, at a point along the lower one-half length of the rotary vessel, where the temperature difference between the kiln gases and the mineral are the greatest, to mix the gas released from the mineral with combustion gases from the primary burner. Preferably the mass flow rate of the injected air is about 1 to about 15% of the mass rate of use of combustion air by the kiln.

In one embodiment air is injected into the rotary vessel preferably through an air injection tube extending from a port in the rotary vessel wall into the rotary vessel and terminating in a nozzle for directing the injected air along a predetermined path in the rotary vessel. Typically air is injected into the rotary vessel through two or more nozzles positioned in the rotary vessel at a distance of about H to about 2H from the wall of the rotary vessel wherein "H" is the maximum depth of the mineral bed in the vessel. Preferably the predetermined path of the injected air is directed to impart rotational momentum to the combustion gases flowing through the rotary vessel. In one aspect of the invention the method further comprises the step of burning supplemental fuel delivered into the rotary vessel downstream relative to kiln gas flow in the kiln from where the air is injected into the kiln. In still another embodiment of the invention the method further includes the step of injecting air into the rotary vessel at a velocity of about 100 to about 1000 feet per second at a point downstream, relative to gas flow in the kiln, from the supplemental fuel delivery port to mix the gas released from both the mineral bed and the burning supplemental fuel with the combustion gases from the primary burner. The rate of injection of air into the kiln is generally about 1% to about 15%, more typically about 1% to about 7% of the mass of the total combustion air required per unit time during kiln operation. In one particular embodiment of the invention the air injection nozzles have an orifice with an aspect ratio greater than 1, for example, an orifice of rectangular or elliptical cross-section.

In another aspect of the invention there is provided a method for reducing $NO_x$ emissions and improving combustion efficacy in a preheater/precalciner (PH/PC) cement kiln. The precalciner kiln has a rotary vessel portion having a primary burner combustion zone and a stationary precalciner vessel portion having secondary burner combustion zone. Each of the primary burner and the precalciner portion is supplied with controlled amounts of preheated combustion air. In operation the combustion gases from the primary combustion zone flows serially through the rotary vessel, the precalciner vessel portion and into a series of cyclones in counter-flow communication with a mineral feed. The method of the present invention as applied to a precalciner kiln comprises the step of injecting compressed air into the precalciner vessel portion of the kiln at a point before the first cyclone, at a mass rate corresponding to about 1% to about 7% of the total combustion air per unit time required by the kiln. Preferably the air is injected at a velocity of about 100 to about 1000 feet per second through two or more air injection nozzles. In one embodiment the air is compressed to a pressure of about 4 to about 150, more typically about 40 to about 100 pounds per square inch before being injected into the precalciner vessel portion. Preferably the nozzles are directed into the precalciner vessel to optimize cross-sectional mixing of the contained gases and fluidized mineral. In one embodiment the nozzles are positioned to promote turbulent flow in the vessel and in another embodiment the nozzles are directed into the precalciner vessel to promote rotational or cyclonic flow in said vessel.

In an alternate embodiment of the present invention there is provided a modified precalciner cement kiln wherein the modifications comprise an air injection nozzle positioned in or on the stationary precalciner vessel and means for delivering compressed air to the nozzle and into the vessel at a linear velocity of about 100 to about 1000 feet per second. Preferably the modified kiln is fitted with a plurality of nozzles positioned to deliver compressed air into the precalciner vessel.

In still another embodiment of the present invention there is provided a mineral processing kiln modified for operation with reduced $NO_x$ emissions and increased energy efficiency. The kiln comprises an inclined rotary vessel having a primary burner and combustion air inlet at its lower end. The kiln finds particular application to the thermal processing of minerals that undergo a gas releasing chemical reaction during thermal processing. The kiln is modified to include an air injection tube for injecting air into the rotary vessel at a velocity of about 100 to about 1000 feet per second. The injection tube extends from a port in the wall of the vessel and into the rotary vessel terminating in a nozzle for directing the injected air along a predetermined path in the vessel. The port is preferably located at a point along the lower one-half length of the rotary vessel to mix gas released from the mineral bed with combustion gases from the primary burner. Additional modifications of the kiln include a fan or compressor in air flow communication with the air injection tube and a controller for the fan or compressor to adjust the rate of air injection into the kiln. The fan or compressor can be stationary and in air flow communication with the port in the wall of the vessel via, for example, an annular plenum aligned with the path of the port during rotation of the vessel. Alternatively, the fan or compressor can be mounted on the wall of the rotary vessel for direct air injection into the kiln. Power is delivered to fan or compressor mounted on the surface of the vessel via a circumferential power ring.

Preferably the modified mineral processing kiln is modified to include two or more air injection tubes for injecting air into the rotary vessel, each injection tube terminating in a nozzle for directing the injected air along a predetermined path in the vessel. Preferably the nozzle or nozzles are positioned in the rotary vessel at a distance of about H to about 2H from the wall of the rotary vessel wherein "H" is the maximum depth of the mineral bed in the rotary kiln vessel. The air injection nozzles are preferably positioned so that the predetermined path of the injected air from each nozzle works to impart rotational momentum to the combustion gases flowing through the rotary vessel.

The air injection tubes can be mounted to extend from the port into the rotary vessel perpendicular to a tangent to the rotary vessel at the port and terminate in a nozzle for directing the injected air along a predetermined path in the vessel selected to impart rotational momentum to the kiln gas stream. Alternatively, the injection tube(s) can be positioned to extend from the port in the rotary vessel into the vessel at an acute angle to a tangent at the port and substantially perpendicular to a radius line of the rotary vessel extending through the end of the tube. Air injection tubes so configured work to direct the injected air across the kiln gas stream to impart rotational momentum to the kiln gas stream at the point of injection. In one embodiment, the orifice of the injection tube is formed to have an aspect ratio greater than one.

The injection tube is formed to communicate with a source of pressurized air, preferably a fan, blower, or compressor capable of providing a static pressure differential of greater than about 0.15 atmospheres, preferably greater than about 0.20 atmospheres. The fan, blower, or compressor is sized and powered sufficiently to deliver injected air continuously into the kiln with a kinetic energy input of about 1 to about 10 watt/hour per pound of injected air (corresponding to about 0.1 to about 1 watt/hour per pound of kiln gas.) The size of the orifice of the air injection nozzles are selected so that the mass flow rate of injected air at the applied static pressure is about 1 to about 15%, more preferably about 1 to about 10% into the rotary vessel or about 1 to about 7% where air is injected into the stationary preheater/precalciner portion. The linear velocity of the injected air typically ranges from about 100 feet per second to about 1000 feet per second.

In one embodiment the modified mineral processing kiln further comprises a supplemental fuel delivery port and a tube extending from the port into the rotary vessel at a point on the vessel downstream, relative to gas flow in the kiln, from the location of the air injection tube. The kiln can be further modified to include one or more additional air injection tubes for injecting air into the rotary vessel at high velocity under the influence of a fan or compressor in gas flow communication with the air injection tube. The injection tube terminates in a nozzle for directing the injected air along a predetermined path in the vessel. The air injection tube is located at a point on the rotary vessel downstream, relative to gas flow into the kiln, from the supplemental fuel delivery port to mix gases released from both the mineral bed and the burning supplemental fuel with the combustion gases from the primary burner. A controller is provided for the fan or compressor to adjust the rate of air injection into the kiln at the downstream air injection point.

In one other aspect of the invention there is provided a method for reducing $NO_x$ in the effluent gas stream from a long rotary cement kiln modified for burning supplemental fuel. The kiln in operation comprises an inclined cylindrical vessel rotating about its long axis. The vessel is heated at its lower end by primary burner and charged with raw material at its upper end. A kiln gas stream flows from the heated lower end having a primary burner and a combustion air inlet through the upper end of the vessel. The in-process mineral material forms a mineral bed flowing at a maximum depth H under the influence of gravity in the vessel countercurrent to the kiln gas stream from a drying zone in the upper most portion of the rotary vessel. The mineral bed flows through an intermediate calcining zone, and into a high temperature clinkering zone before exiting the lower end as cement clinker. Supplemental fuel is charged into the vessel through a port and a drop tube in communication with the port in the vessel wall to burn in contact with calcining mineral in a secondary burning zone coincident with at least a portion of the calcining zone. Application of the present invention to reduce $NO_x$ in the effluent gas stream from the kiln comprises the step of injecting air at a velocity of about 100 to about 1000 feet per second through an air injection tube extending from a port in the vessel and terminating in a nozzle for directing the injected air along a predetermined path in the vessel. The air injection port is located at a point downstream relative to kiln gas flow of the clinkering zone and upstream relative to kiln gas flow of the upper end of the calcining zone. The air injection nozzle is positioned in the vessel a distance from about H to about 2H from the wall of the vessel and the predetermined path of the injected air preferably forms an angle of greater than 45 degrees with a line segment parallel to the rotational axis of the vessel and extending from the point of injection through the mineral feed in the vessel. The rate of injection of the air into the vessel is controlled to be about 1% to about 10% of the mass of the total combustion air used per unit time during kiln operation.

In another aspect of the disclosure, there is provided a method of imparting momentum to kiln gases which are exiting the rotary vessel of the kiln. The kiln in operation includes a stationary portion positioned proximate the upper end of the rotary vessel. The stationary portion includes a stationary vessel and includes injectors in communication with the stationary vessel. The injectors are configured to introduce a quantity of unheated air into the stationary vessel. The quantity of unheated air imparts momentum to kiln gases which are exiting the rotary vessel and flowing through the stationary vessel.

BRIEF DESCRIPTION OF THE DRAWINGS

FIGS. 1–4 are similar and illustrate partially broken away diagrams of mineral processing kilns modified in accordance with the present invention for injection of high velocity mixing air into the rotary vessel.

FIGS. 10a and 10b are similar illustrating the stoichiometry of primary burner combustion without high velocity injection air (10a) and with 10% injected high velocity air (10b).

FIGS. 21 and 22 are similar to FIGS. 1–4 and illustrate partially broken away diagrams of mineral processing kilns modified for air injection with diagrammatic representation of kiln gas monitoring and controllers for air injection and steam or fluid gas injection.

DETAILED DESCRIPTION OF THE ILLUSTRATED EMBODIMENTS

Figure 5:
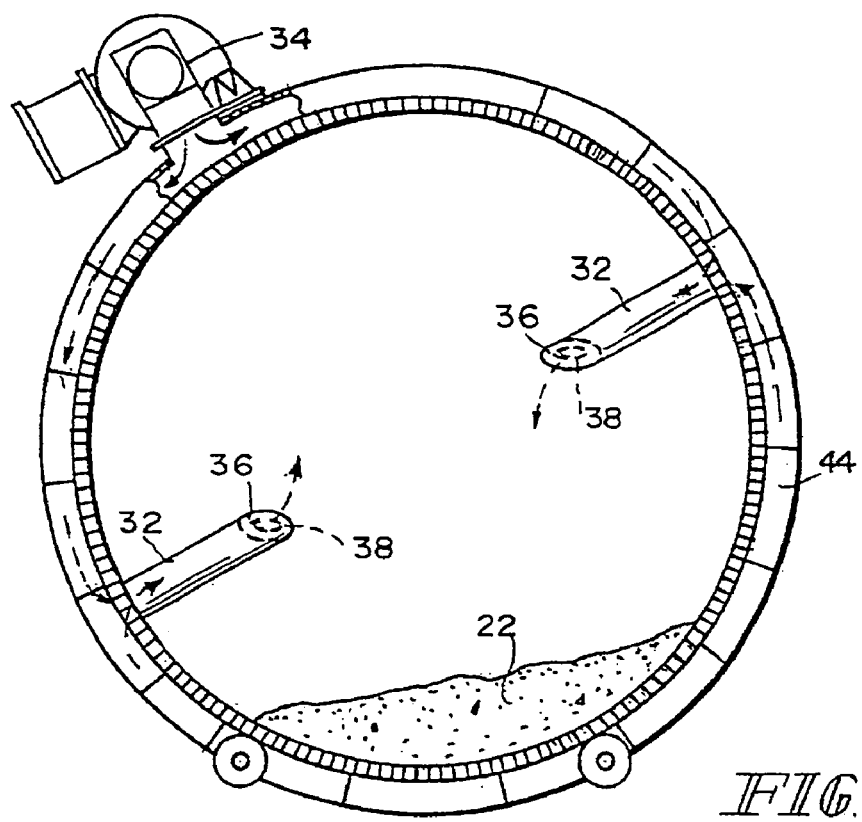
FIGS. 5, 6, and 7 are similar cross-sectional views of rotary kilns modified in accordance with the present invention illustrating alternative embodiments for delivering high velocity mixing air into the rotary vessel.

In accordance with the present invention air is injected into a mineral processing rotary kiln to deliver energy to the gases in the kiln to achieve cross sectional mixing. This invention provides for injection of air for the purpose of elimination of stratification of gases in a kiln that during operation is processing a mineral that liberates a gas as it is processed such as kilns processing limestone, cement raw mix, clays as in lightweight aggregate kilns, and taconite kilns. The primary purpose of the injected air is to provide energy for mixing of the gases being liberated from the in-process mineral with the combustion gases coming from the combustion zone of the kiln and accordingly there are a multiplicity of elements specified for this invention which cooperate in whole or in part to achieve the kiln gas cross-sectional mixing effect that provides the advantages realized in use of the invention in a wide variety of mineral processing kilns.

The present invention specifies injection of air for the purpose of reducing or eliminating the stratification of gases in a kiln. A typical kiln is from eight feet to over twenty feet in diameter and has a length to diameter ratios of 10:1 to over 40:1. Materials typically calcined are Portland cement raw materials, clays, limestone, taconite, and other mineral materials that are thermally processed and liberate gases upon heating. The purpose of the injected air in this invention is to provide energy for cross-sectional mixing; the air has little, if any, function of providing oxygen for combustion. It is common for mineral processing kilns, like cement and lime kilns, to control the oxygen content in the exhaust gases to as low a level as practical and yet avoid the formation of significant amounts of carbon monoxide or sulfur dioxide. It is desirable to operate in this manner to maximize thermal efficiency. Thermal efficiency can be adversely affected by operating with two little combustion air, resulting in incomplete combustion of the fuel, or excess combustion air, which results in increased heat losses.

It is desirable to introduce the combustion air for mineral processing through a heat recuperator that recovers the heat from the processed mineral product discharged from the kiln. The heat recovered in the incoming combustion air can be a substantial portion of the total energy supplied to the process. The injection of ambient air into the kiln gas stream, at a location other than the primary combustion zone normally would not be considered favorable due to the negative impact it might have on heat recovery; inherently injected air is substituted for combustion air drawn through the heat recuperator.

Computer modeling of calcining kilns revealed that the gases being liberated by the mineral being processed remains stratified in the kiln. Compared to the hot gases coming from the primary combustion zone at the material discharge end of the counterflow mineral processing kilns, the liberated gases are much lower in temperature and often of higher molecular weight and much higher in density. As a result of this difference in density, these liberated gases remain at the bottom of the kiln. In addition to the gases liberated from the calcining mineral, there may also be combustible substances liberated either from the mineral feed or as fuel added to the process to the mid-portion of the kiln. The liberated gases blanket and shield these combustible materials from the oxygen content in the gases at the upper levels of the kiln gas stream. This blanket of low temperature gases also shields the mineral bed from direct contact with the hot combustion gases. Therefore, the process is required to use an indirect method of heating. The kiln walls are heated by the hot combustion gases and the rotation of the kiln results in the contact of the hot walls with the mineral bed. By the means of this invention, a small portion of the total process air, less than 15 percent, is injected into the rotary vessel in a way that produces a rotational component to the momentum of the kiln gas stream in the kiln. This rotational component results in the hot gases that were traveling along the top of the kiln to be forced down on the bed of the calcining mineral, pushing off the blanket of cool liberated gases. This contacting of hot gases with the mineral bed adds another mechanism of transfer, thus improving the thermal efficiency of the process to the kiln.

The kinetic energy of the injected air and the resulting rotational momentum results in the liberated gases being mixed with the hot combustion gases and any residual oxygen from these gases and the injected air. This cross-sectional mixing results in the oxidation of combustible components that may have been contained in the blanket of gas. Thus, the emissions of the unburnt components, like carbon monoxide, sulfur dioxide, and hydrocarbons, can be reduced at a given excess air level. Or, the prior emission levels can be maintained at a reduced level of excess air resulting in improved process efficiency. The benefit of the new mechanism of heat transfer and the reduced excess air mitigates the negative energy recovery impact from the portion of air that bypasses the recuperator.

The air injection mechanism of this invention is located at a point along the kiln where there is a significant difference between the combustion gas temperature and the temperature of the mineral bed. Typically, this would be a location in the kiln as close to the combustion zone as practical, limited by the service temperature limit of the apparatus, expected to be about 2800° F., to a position at the cooler end of the calcining zone limited by a temperature adequate to allow combustion after mixing occurs, about 1600° F. to about 1850° F. In one embodiment of the invention, the air injection tube is located in the hottest half portion (the lower half) of the rotary vessel. Given the nature of most minerals calcined in rotary kilns, the benefit will also be obtained by installing the apparatus in the calcining zone to break up and eliminate the stratification. The apparatus can also be placed at the lower end where the mineral is almost completely calcined, to disrupt the formation of the high-density gaseous blanket on the in-process mineral. Multiple air injection tubes, either circumferential displaced, axially displaced, or both axially and circumferentially displaced, can be located on the kiln. They can each be independently connected to a fan, blower or compressor or they can be in air injection flow communication with a pressurized manifold.

It is also possible to take advantage of the oxygen content in the injected air to create staged combustion for the purpose of controlling nitrogen oxides. Because of the above-noted lost energy recovery in the combustion air, staged combustion in mineral processing rotary kilns is not practiced due to the perceived high-energy penalty. Rotary kilns, such as incinerators or coke processing kilns, may practice staged combustion, but such kilns do not have a high amount of recoverable energy in their discharge product and thereby do not have the functional limitations of mineral processing kilns. Also, due to the improved efficiency of combustion, less excess air is required to achieve complete combustion. The enhanced mixing and resulting lack of combustion stratification in the kiln will allow the achievement of staged combustion with quantities of excess air that do not unduly upset the process energy requirements. High-energy injection of air for cross-sectional mixing enables the use of staged combustion in mineral processing kilns for emission control.

Figures 7, 7A, 8A, 8B:
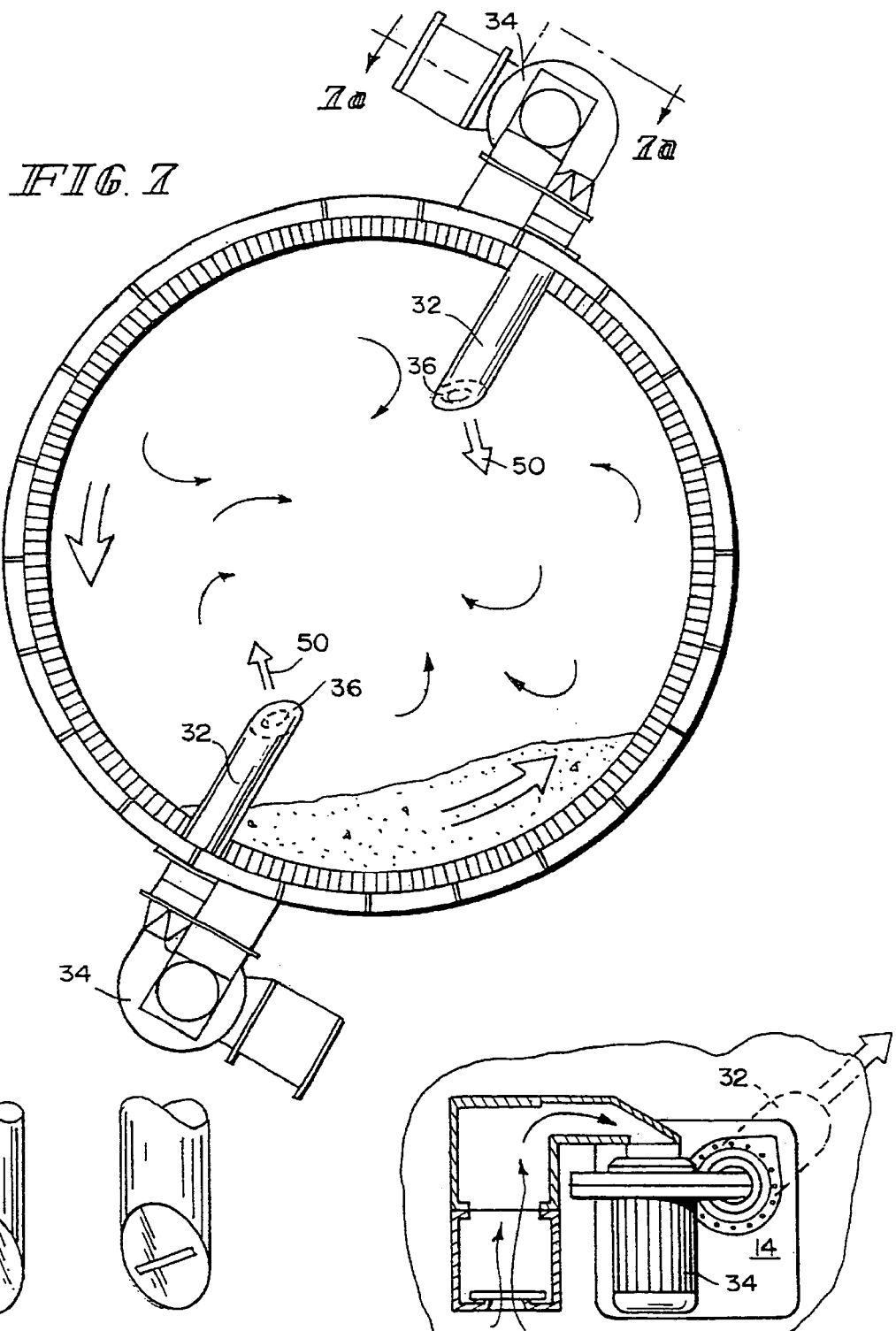
FIG. 7a is A partially broken away plan view of the fan in FIG. 7 across lines AA.
FIGS. 8a and 8b illustrate alternate nozzle orifice configurations.

With reference to FIGS. 1–4 mineral processing kilns 10 include a rotary vessel 12 having a cylindrical wall 14, a lower combustion air inlet/burner end 16 and an upper gas exit end 18. In operation raw mineral feed 20 is delivered to the gas exit end 18 and with rotation of rotary vessel 12 the mineral bed moves from the gas exit end 18 toward the air inlet/burner end 16 flowing counter-current to combustion products forming the kiln gas stream. Burner 24 is supplied with primary fuel source 26, and combustion air is drawn from hear recuperator 30 through hood 28 into combustion air inlet end 16. The processed mineral exits the combustion air inlet end 16 and is delivered to heat recuperator 30. One or more air injection tubes 32 in air flow communication with a fan, blower or compressor 34 are located along the length of rotary vessel 12 at points where the in-process mineral in mineral bed 22 is calcining or where the temperature differences between the kiln gas stream and mineral bed are the most extreme, most typically in the lower most one-half portion of rotary vessel 12, the portion more proximal to the combustion air inlet/burner end 16 than the gas exit end 18. Air injection tubes 32 terminate in the rotary vessel as a nozzle 26 positioned to direct the injected air along a path designed to impart rotational momentum to the kiln gas stream. Orifice 38 in nozzle 36, in one embodiment of the invention, has an aspect ratio greater than one (See FIGS. 8a and 8b illustrating orifices of rectangular cross-section).

With reference to FIGS. 3 and 4, the mineral processing kiln can be further modified to burn supplemental fuel delivered from supplemental fuel source 40 through fuel delivery device 42 into the rotary vessel to burn in contact with the in-process mineral in mineral bed 22. In one embodiment of the invention, air is injected to impart rotational momentum to the kiln gas stream at a point between fuel delivery device 42 and combustion air inlet/burner end 16. Optionally air is injected at one or more additional points on rotary vessel 12 between the supplemental fuel delivery device 42 and gas exit end 18.

Figure 6:
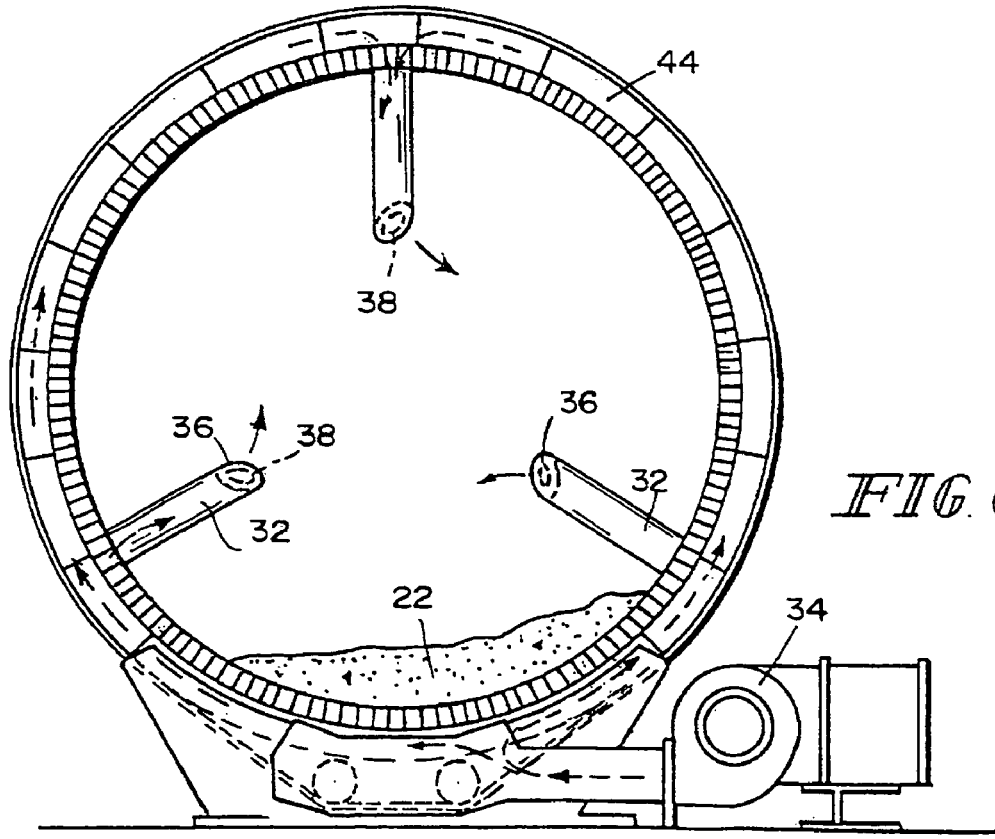

With reference to FIGS. 5 and 6, two or more air injection tubes 32 can be circumferentially (or axially) on the cylindrical wall 14 of rotary vessel 12. Pressurized air is delivered to the injection tubes by fan or blower 34 in air flow communication through manifold 46. Alternatively, as depicted in FIG. 7, each injection tube can be connected directly to a blower or fan 34 for delivery of high energy/velocity air into the kiln gas stream. The air injection tubes 34 terminate in the kiln at a point between the top of mineral bed 22 and the axis of rotation of rotary vessel 12 in the form of a nozzle for directing high energy injected air 50 into the rotary vessel to impart rotational momentum to the kiln gas stream.

Figure 9A:
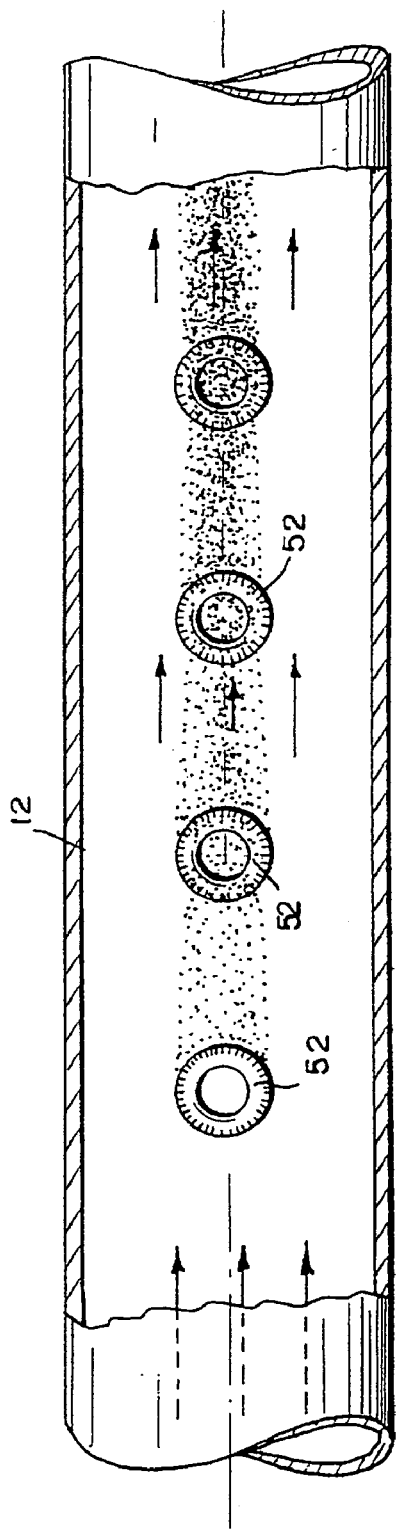
FIGS. 9a and 9b illustrate flow patterns in a cement kiln without high velocity injected air (9a) and with high velocity injected air in accordance with this invention (9b) upstream of a supplemental fuel (tire) delivery apparatus (not shown).
Figure 9B:
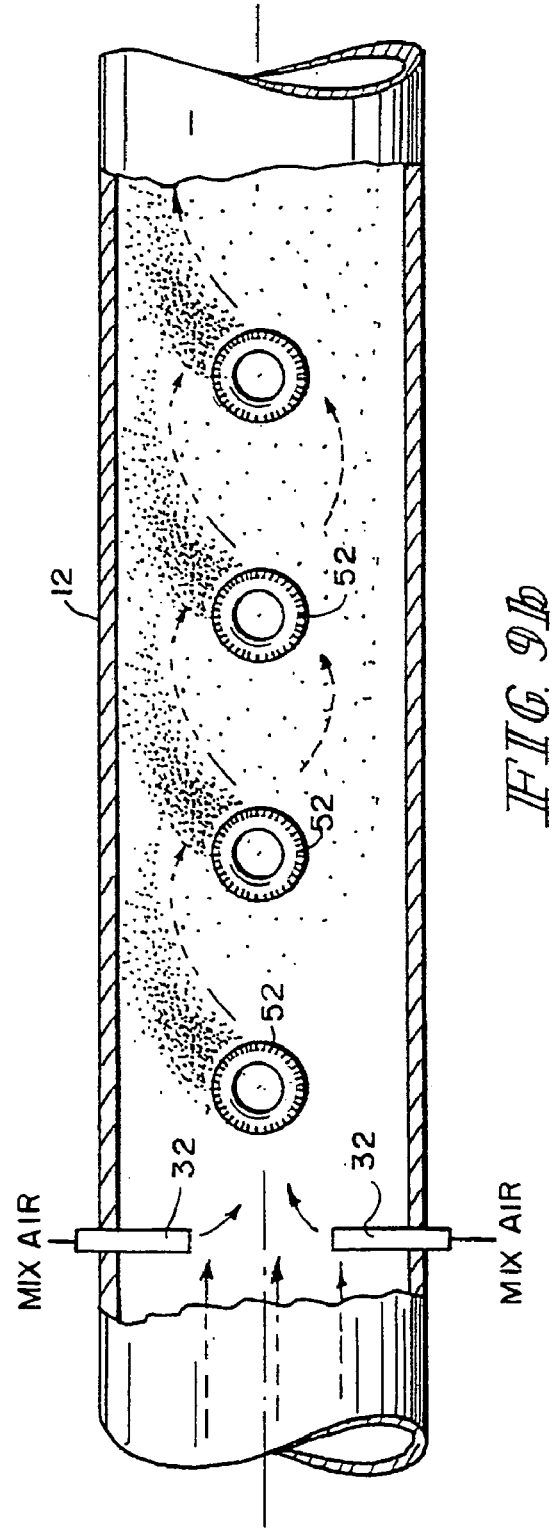
Figure 11:
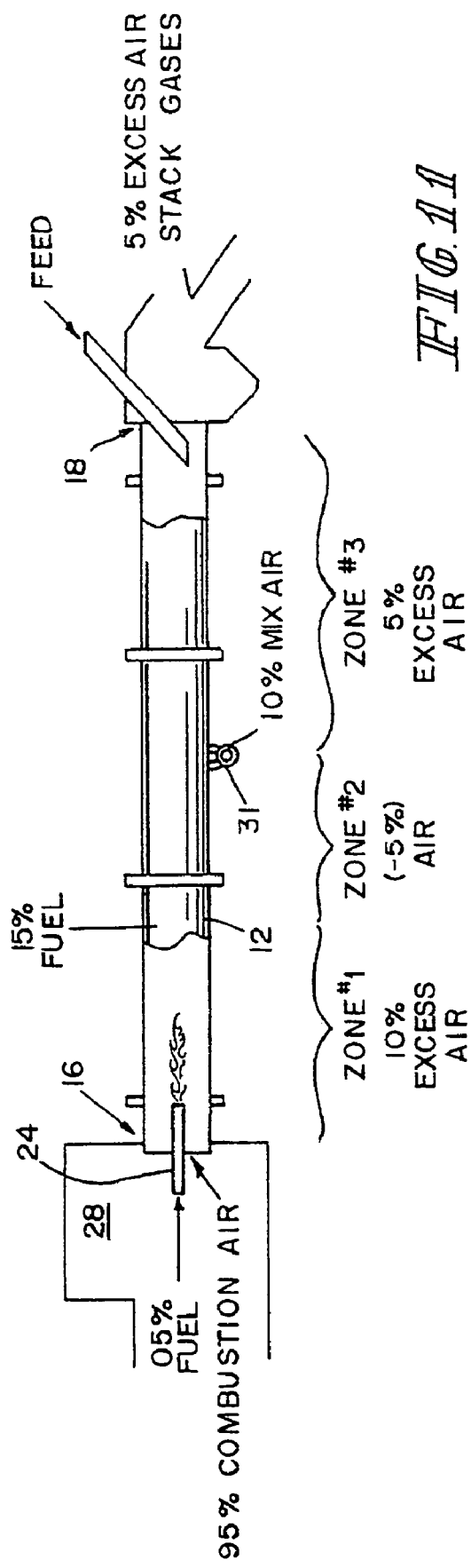
FIG. 11 is similar to FIG. 10 and shows the stoichiometry of combustion in three zones in a kiln operated with 15% supplemental fuel delivered to the kiln upstream of the injection of 10% high velocity air.
Figure 13:
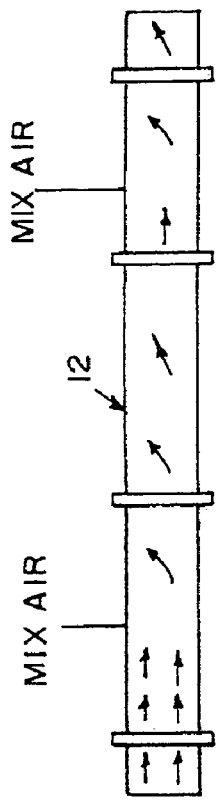
FIG. 13 illustrates the effects of injected high velocity air on kiln gas flow in the kiln illustrated in FIG. 12.
Figure 12:
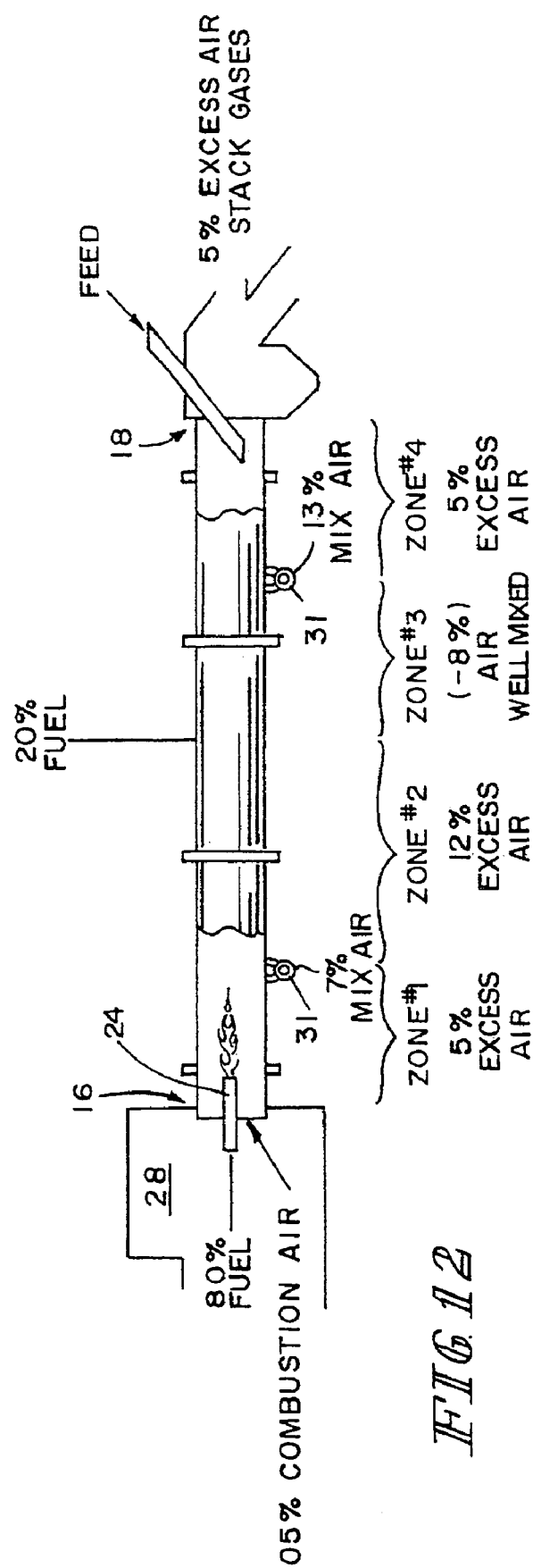
FIG. 12 is similar to FIG. 11 illustrating the stoichiometry of kiln fuel combustion wherein the kiln is modified for burning of supplemental fuel and for injection of high velocity air both upstream and downstream of the point of fuel delivery into the rotary vessel.

With reference to FIG. 9b, by injecting high energy air into the kiln to produce rotational momentum in the kiln gas stream supplemental fuel elements 52 burning in the kiln gas stream are continuously cleared of their own combustion products and contacted with mixed kiln gases to provide more favorable conditions for combustion and energy transfer.

Figure 14:
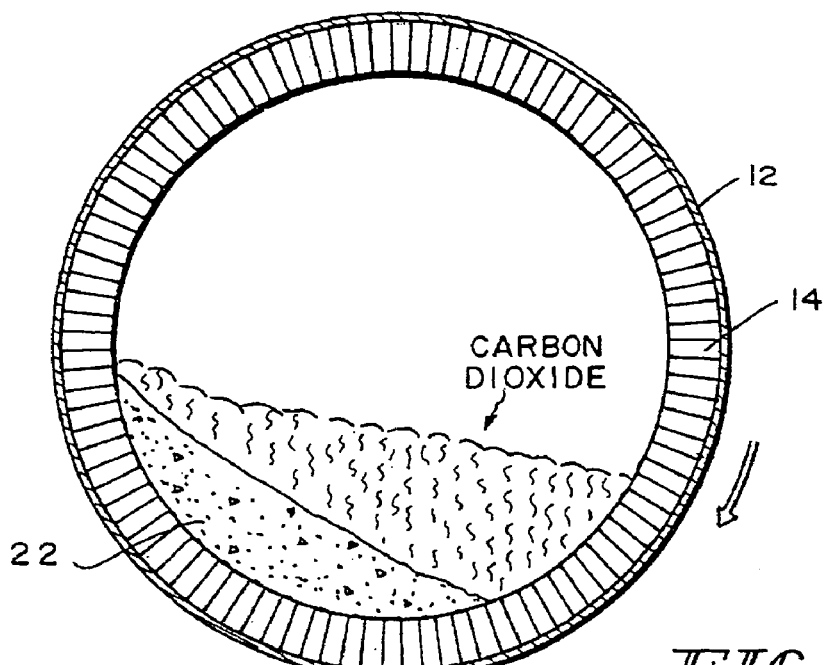
FIG. 14 is a cross-sectional view of a rotary kiln vessel containing in-process mineral releasing a gas (carbon dioxide).
Figure 15:
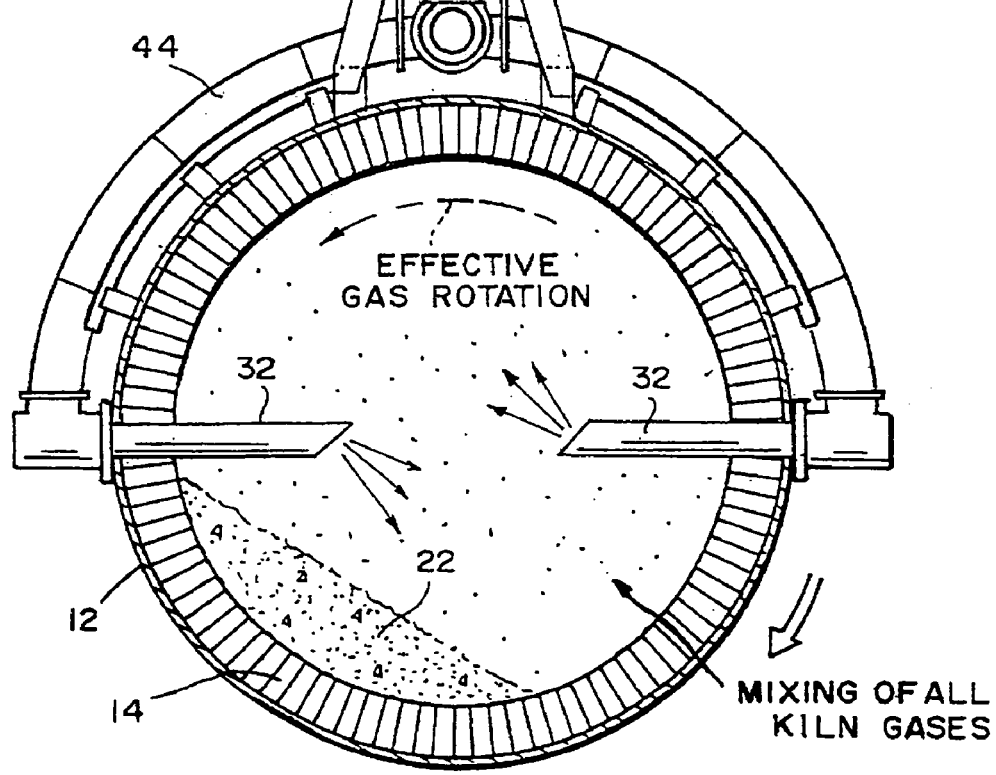
FIG. 15 is similar to FIG. 14 showing mixing of the kiln gases by injection of high velocity air into the rotary vessel.
Figure 16:
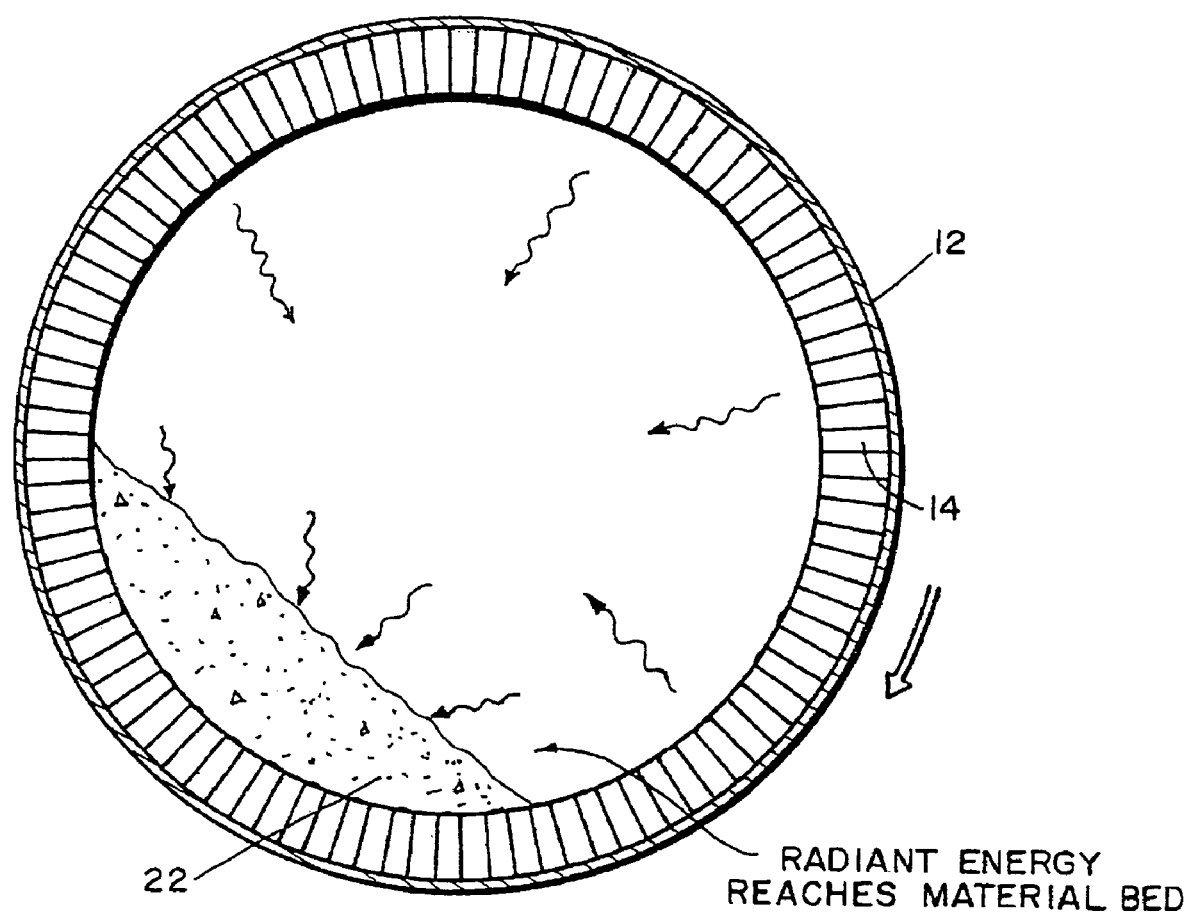
FIG. 16 illustrates the radiant energy transfer to in-process material in the absence of a stratified layer of gases released from the mineral bed.
Figure 17:
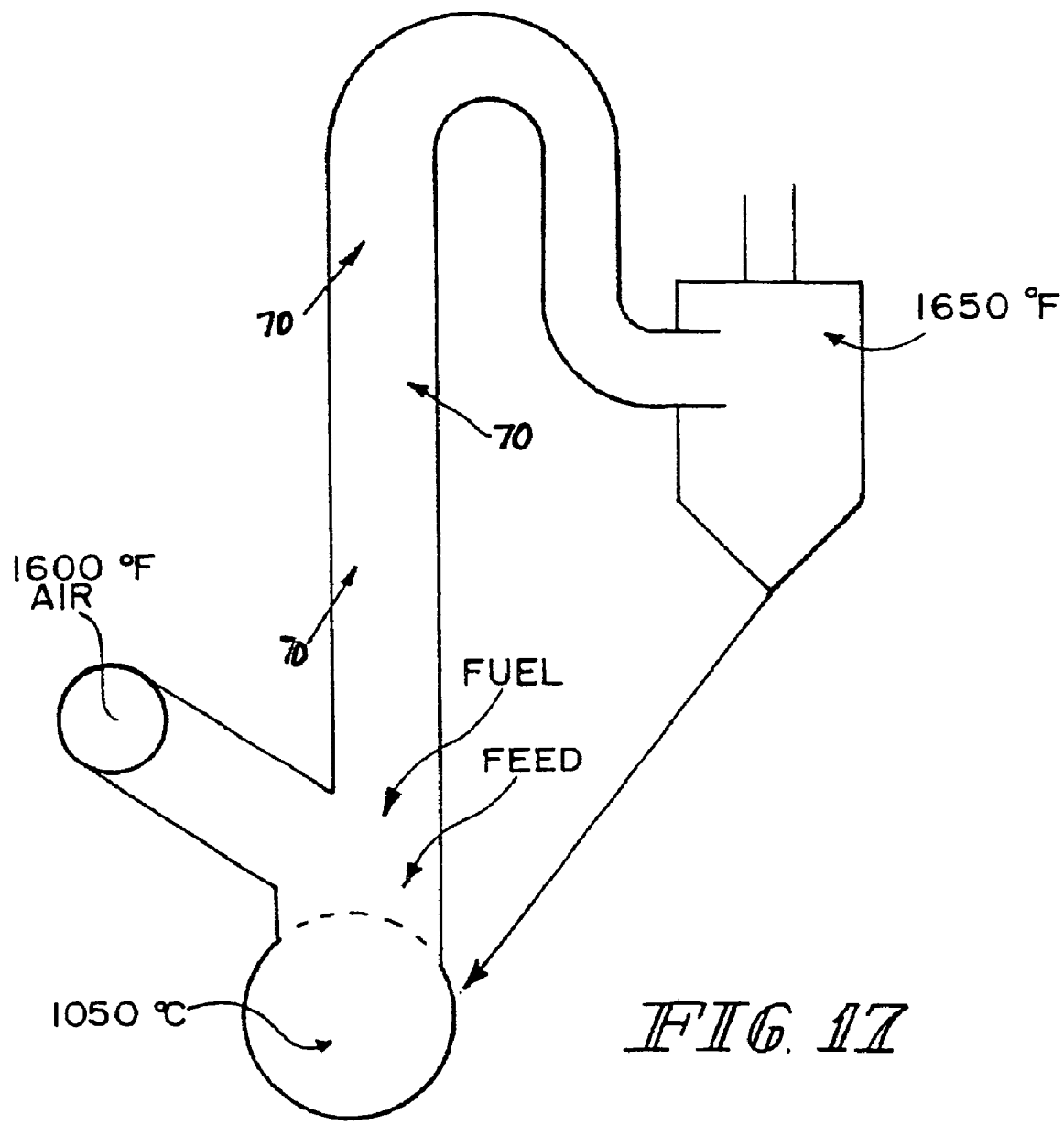
FIGS. 17–20 illustrate diagrammatically various configurations of commercially available stationary precalciner vessels with "arrows" illustrating points for injection of high velocity air to promote mixing in the stationary vessels with high velocity injected air.
Figure 18:
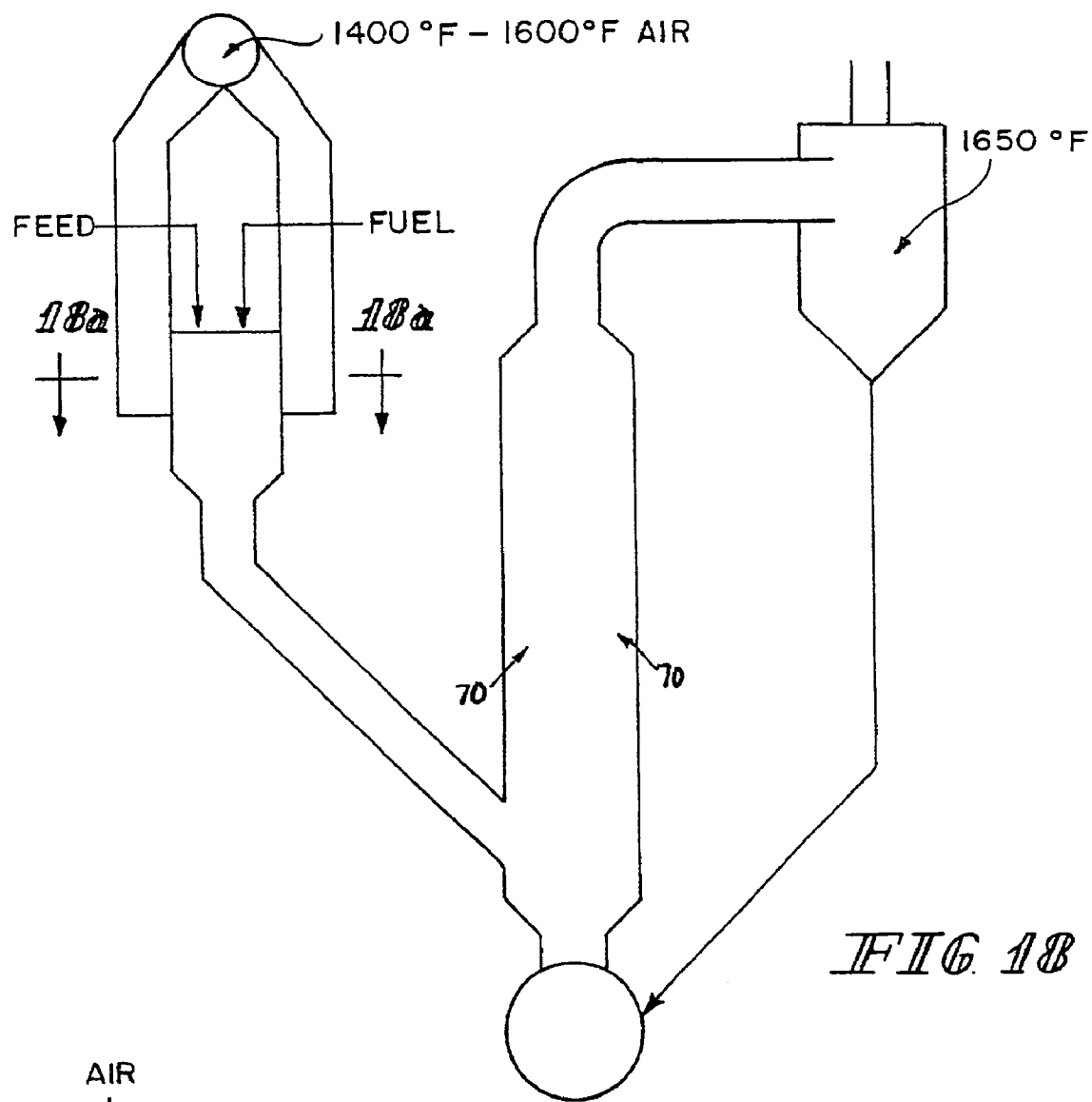
Figure 18A:
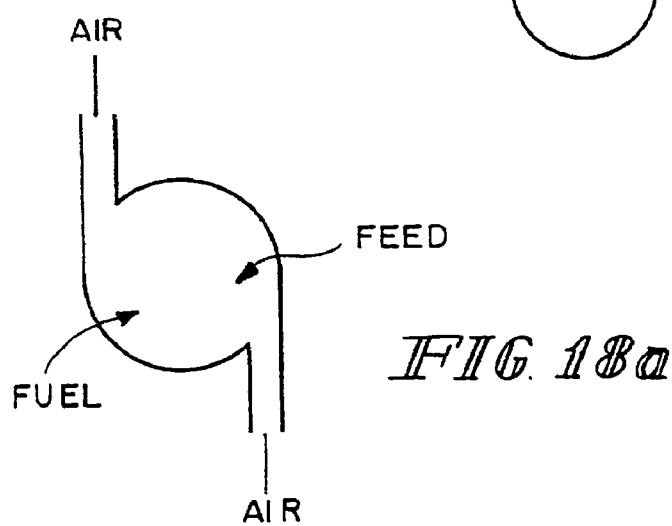
Figure 19:
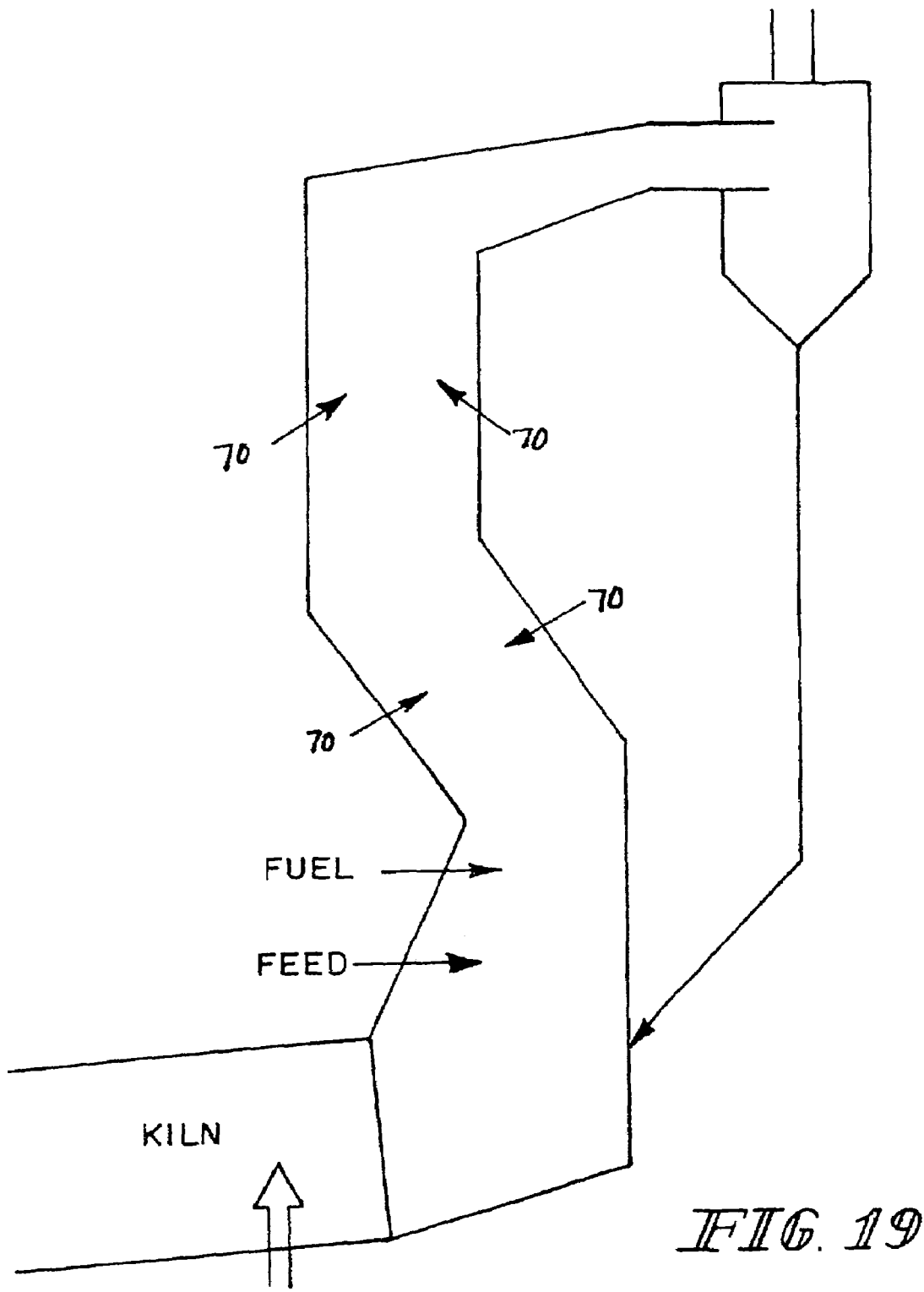
Figure 20:
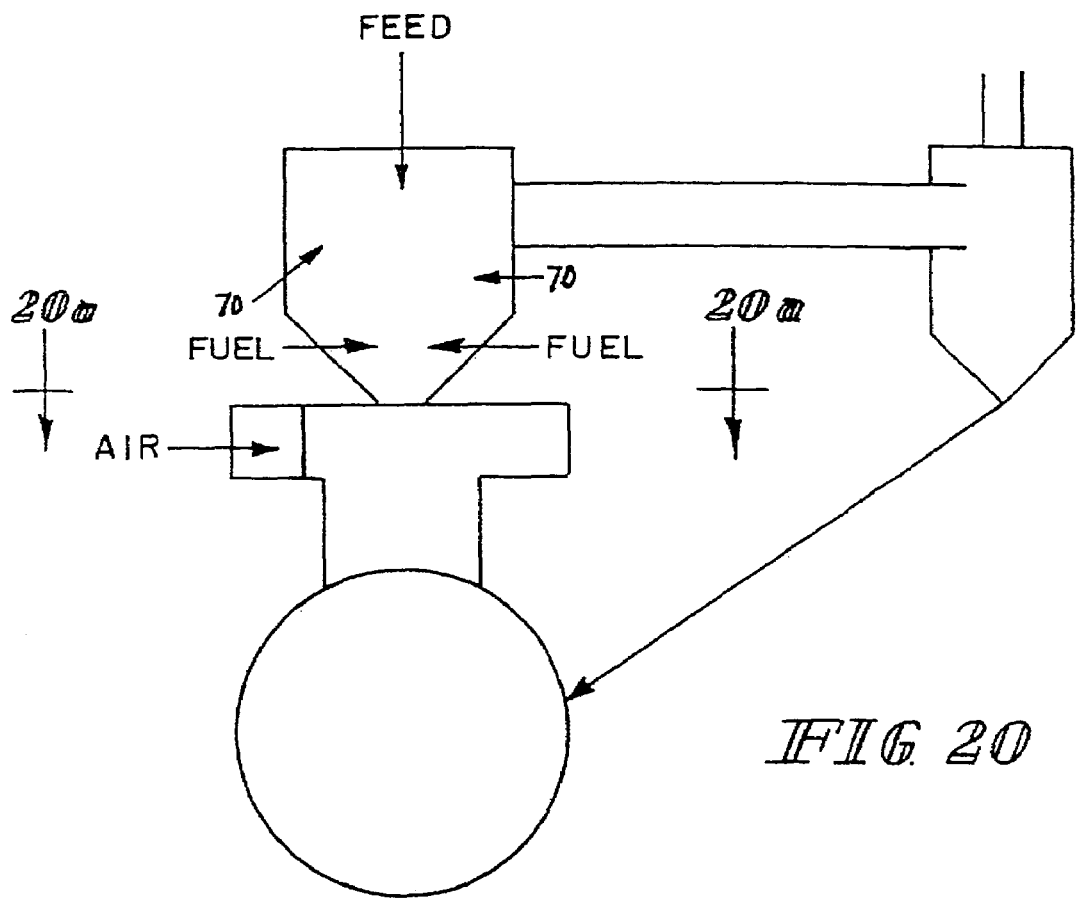
Figure 20A:
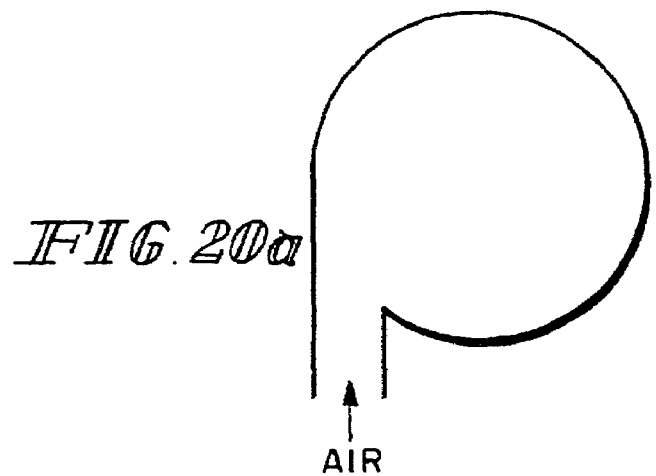

With reference to FIGS. 14 and 15, injection of high energy mixing air effective to impart rotational momentum in the kiln gas stream works to dissipate stratified layers produced, for example, by calcining mineral in the mineral bed 22. With removable or dissipation of the more dense carbon dioxide strata normally covering mineral bed 22 radiant energy from the kiln gas stream and the cylindrical walls 14 of rotary vessel 12 reaches the bed to allow more efficient energy transfer between the kiln gas stream and the end process mineral. (See FIG. 16).

With reference to FIGS. 17 through 20 illustrating various configurations of the stationary portions of preheater/precalciner kilns, there are indicated points 70 for injection of high pressure air into the stationary portions to create either turbulent flow or rotational momentum in the gas stream flowing through those stationary portions. Thus air can be injected at high pressure/energy, for example, from a compressor, through one or more nozzles located in the walls of the stationary portion of a preheater/precalciner kiln to provide mixing energy with consequent reduction of pollutants associated with stratification and localized combustion heterogeneity in such precalciner equipment.

In one embodiment of the invention, referring to FIGS. 21 and 22 the kiln gas stream is monitored for emissions contents/profile at or near the gas exit end 18 of rotary vessel 12 to provide signals characteristic of said emission profile for input to one or more controllers for the kiln including an air injection controller or air injection controller and a controller for injecting steam or flue gas into the kiln gas stream to provide thermal ballast to the kiln gas stream.

Figure 23:
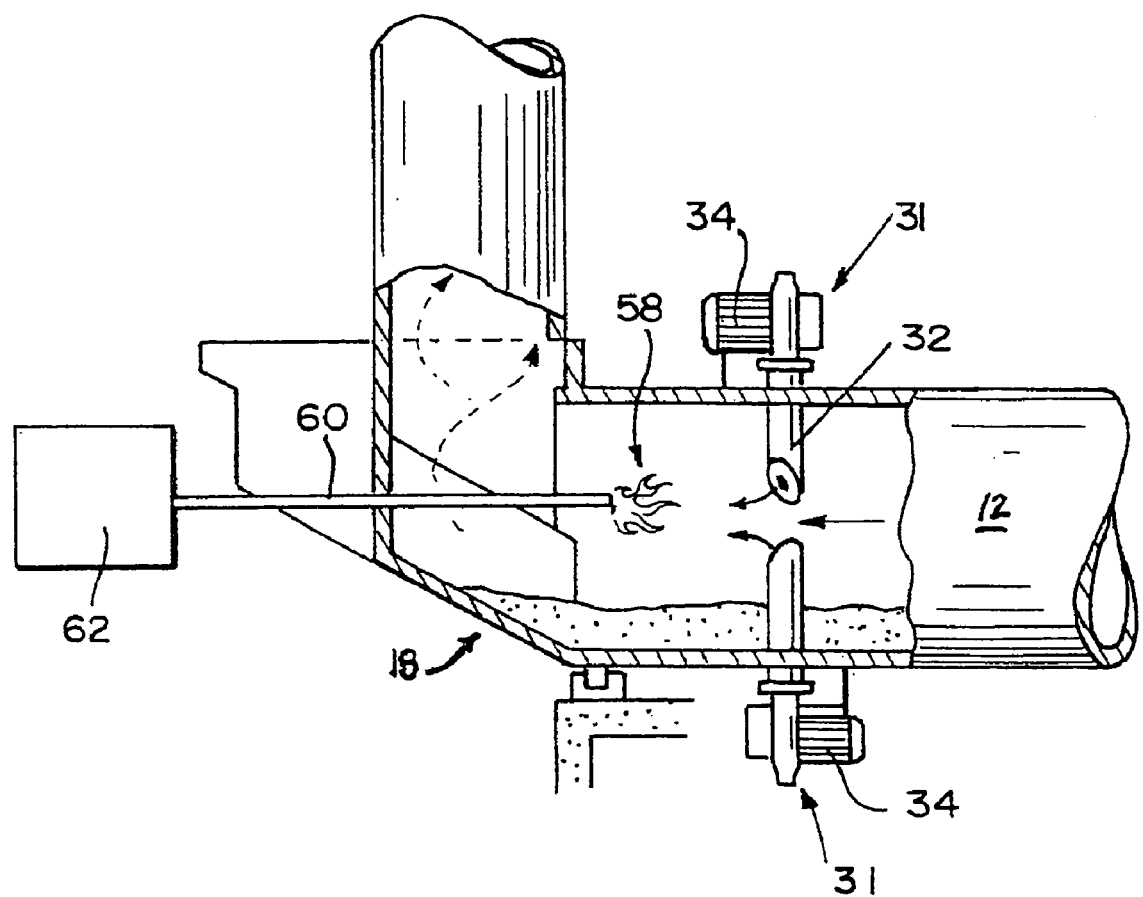
FIG. 23 is a partially broken away elevation of the upper end portion of the rotary vessel of a precalciner kiln modified for air injection and supplemental fuel delivery for $NO_x$ reduction.

In one application of the present invention illustrated in FIG. 23, air injector units 31 are positioned within two kiln diameters of the gas exit end 18 of rotary vessel 12 in a preheater/precalciner kiln end. The temperature of the kiln gas stream at the point of air injection is about 2200° F. to about 1800° F. Supplemental fuel 58 is sprayed from supplemental fuel delivery tube 60 connected to fuel source 62 to create reducing conditions in the high-energy injection air-mixed kiln gas stream at the gas exit end 18 of the rotary vessel 12 to effect reduction in $NO_x$ emissions from the preheater/precalciner kiln.

With reference to FIGS. 24 through 27, various configurations of stationary portions 54 of preheater/precalciner kilns are illustrated having points for injection of high pressure air into the stationary portions 54 to create mixing in the kiln gas streams flowing through those stationary portions 54. Thus, air can be injected at high pressure, for example, from a compressor, through one or more points located in the walls of the stationary portion 54 of any preheater/precalciner kiln to provide mixing momentum of the gas with consequent reduction of pollutants associated with stratification and localized combustion heterogeneity in such preheater/precalciner equipment.

Figure 24A:
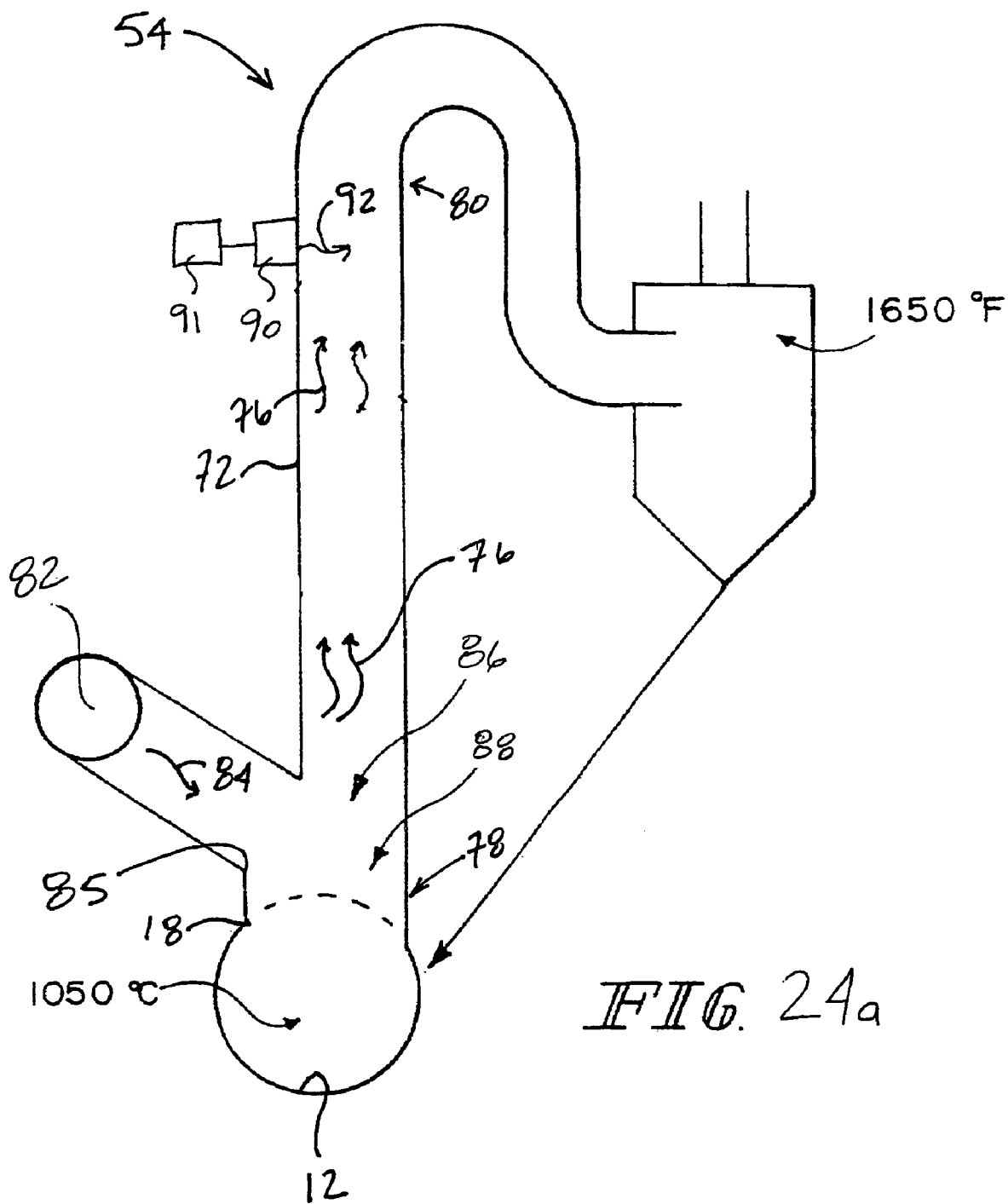
FIGS. 24–27 illustrate diagrammatically various configurations of commercially available stationary precalciner vessels which have been modified to include injectors which introduce high pressure air to promote mixing in the stationary vessels.

Turning to FIG. 24a, the stationary portion 54 comprises a stationary vessel or riser duct 72 which is positioned proximate the upper end 18 of the rotary vessel 12. As such, the stationary vessel 72 is coupled to the rotary vessel 12 such that kiln gas stream 76 flows out of the rotary vessel 12 and into the stationary vessel 72. The kiln gas stream 76 flows from a lower end 78 to an upper end 80 of the stationary vessel 72.

The stationary portion 54 may include a secondary combustion zone 82 which introduces preheated combustion air such as tertiary air 84 via an inlet 85. The secondary combustion zone 82 includes the flow of heated tertiary air 84 at a temperature range of about 1400° F. to about 2000° F. At this location, the flow of heated tertiary air 84 is introduced into the stationary portion 54 to assist combustion within the stationary portion 54. The stationary portion 54 may also include a fuel inlet 86 and feed assembly 88. The fuel inlet 86 opens into the stationary portion 54 through which fuel, such as coal, can be introduced into the stationary portion 54. The feed assembly 88 opens into the stationary portion 54 through which feed such as mineral can be introduced into the stationary portion 54. For the preheater/precalciner kiln, the stationary portion 54 may also include nozzles to provide oxygen containing gas, typically pre-heated combustion air, adjacent the fuel inlet 86 to promote distribution of the fuel flowing through the fuel inlet 86 and the feed flowing into the stationary portion 54 via the feed assembly 88.

The stationary portion 54 may also include an injector 90 for introducing a quantity of high pressure air 92 into the stationary vessel 72 as shown in FIG. 24a. The injector 90 may be embodied as a piece of schedule 80 carbon steel pipe connected to a compressor 91 which generates the quantity of high pressure air 92. Such a piece of pipe may be configured with one or more holes through which the high pressure air flows into the stationary portion. In an embodiment, the injector 90 is positioned in an upper half of the stationary vessel 72. The quantity of high pressure air 92 may comprise unheated air such as ambient air. In other words, this high pressure air 92 is unheated by the kiln process prior to entry into the stationary portion 54. The quantity of high pressure air 92 emitted from the injectors 90 imparts momentum to the kiln gas streams 76 to dissipate any stratified layers of the kiln gas streams 76 flowing from the lower end 78 to the upper end 80 of the stationary vessel 72. As such, the quantity of high pressure air 92 imparts momentum to the kiln gas streams 76 which are exiting the rotary vessel 12 and flowing through the stationary portion 54. It should be appreciated that although only a single injector 90 is shown in FIG. 24a, any number of injectors may be used.

In an embodiment, the injector 90 may be positioned to introduce the quantity of high pressure air 92 that imparts momentum in a direction that is perpendicular relative to the flow direction of the kiln gas streams 76. Such momentum may be quantified relative to the mass of gas and solids to be mixed. It should be appreciated that the higher the ratio of induced momentum to mass of gas to be mixed, the faster the mixing will be. For example, a precalciner vessel or duct operating at 2300 metric tons per day capacity would have a mass flow rate of about 78 kg/sec of solid and gas. A single injector 90 injects 1.66 kg/sec of air 92 at a velocity of 248 m/sec, thereby imparting an additional vector of momentum of 412 kg*m/sec. The ratio of additional imparted momentum to mass in the vessel is 5.28 kg*m/sec per kg of calciner flow (i.e., per kg of gas and solids entering the calciner vessel).

According to one exemplary embodiment, the injector 90 may be operated to introduce a quantity of high pressure air 92 such that the resulting momentum to mass ratio is between 2.0 and 20.0 kg*m/sec per kg of gas and solids entering the calciner vessel. In a more specific exemplary embodiment, the injector 90 may be operated to introduce a quantity of high pressure air 92 such that the resulting momentum to mass ratio is between 4.0 and 10.0 kg*m/sec per kg of gas and solids entering the calciner vessel.

In an embodiment, the injectors 90 may introduce the quantity of high pressure air 92 at a pressure of about 6 psi. In another embodiment, the injectors 90 may introduce the quantity of high pressure air 92 at a pressure of about 6 psi to 12 psi. In yet another embodiment, the injectors 90 may introduce the quantity of high pressure air 92 at a pressure of about 2 psi to 15 psi. Still further, in an embodiment, the injectors 90 may introduce the quantity of high pressure air 92 at a pressure of about 2 psi to 100 psi.

In an embodiment, the injectors 90 may introduce the quantity of high pressure air 92 at a mass flow rate of about 1% to about 5% of the total mass flow rate of the stationary portion 54 (i.e., the total mass flow rate of solids and gas entering the calciner vessel). In another embodiment, the injectors 90 may introduce the quantity of high pressure air 92 at a mass flow rate of about 2% of the total mass flow rate of the stationary portion 54.

Figure 24B:
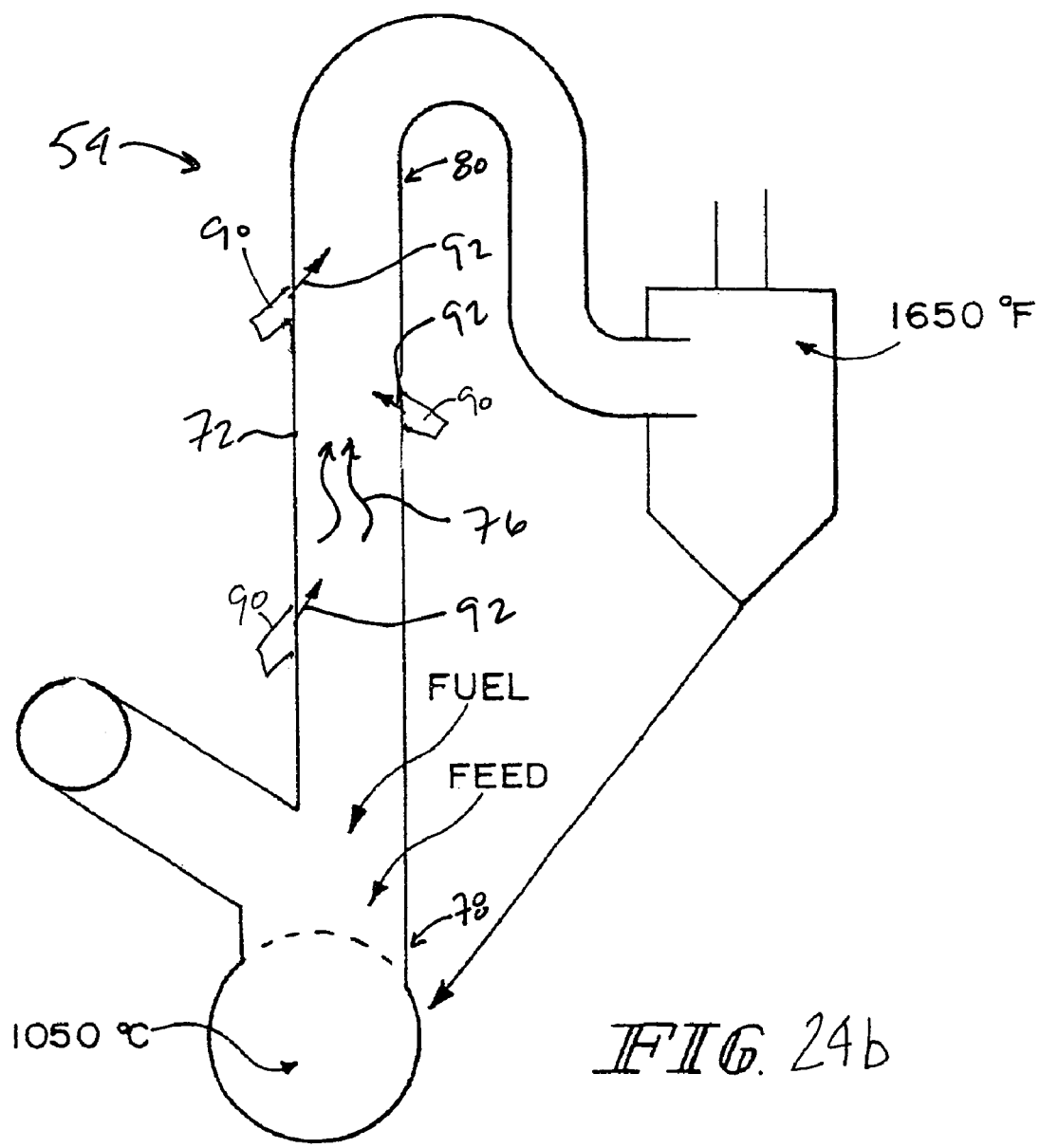

In an embodiment, the injectors 90 may be positioned to introduce the high pressure air 92 that imparts momentum at a non-perpendicular angle relative to the flow direction of the kiln gas stream 76 as shown in FIG. 24b. Moreover, although two injectors 90 are shown in FIG. 24b, it should be appreciated that only a single injector 90 may be used. Conversely, more than two injectors may also be used.

Figure 24C:
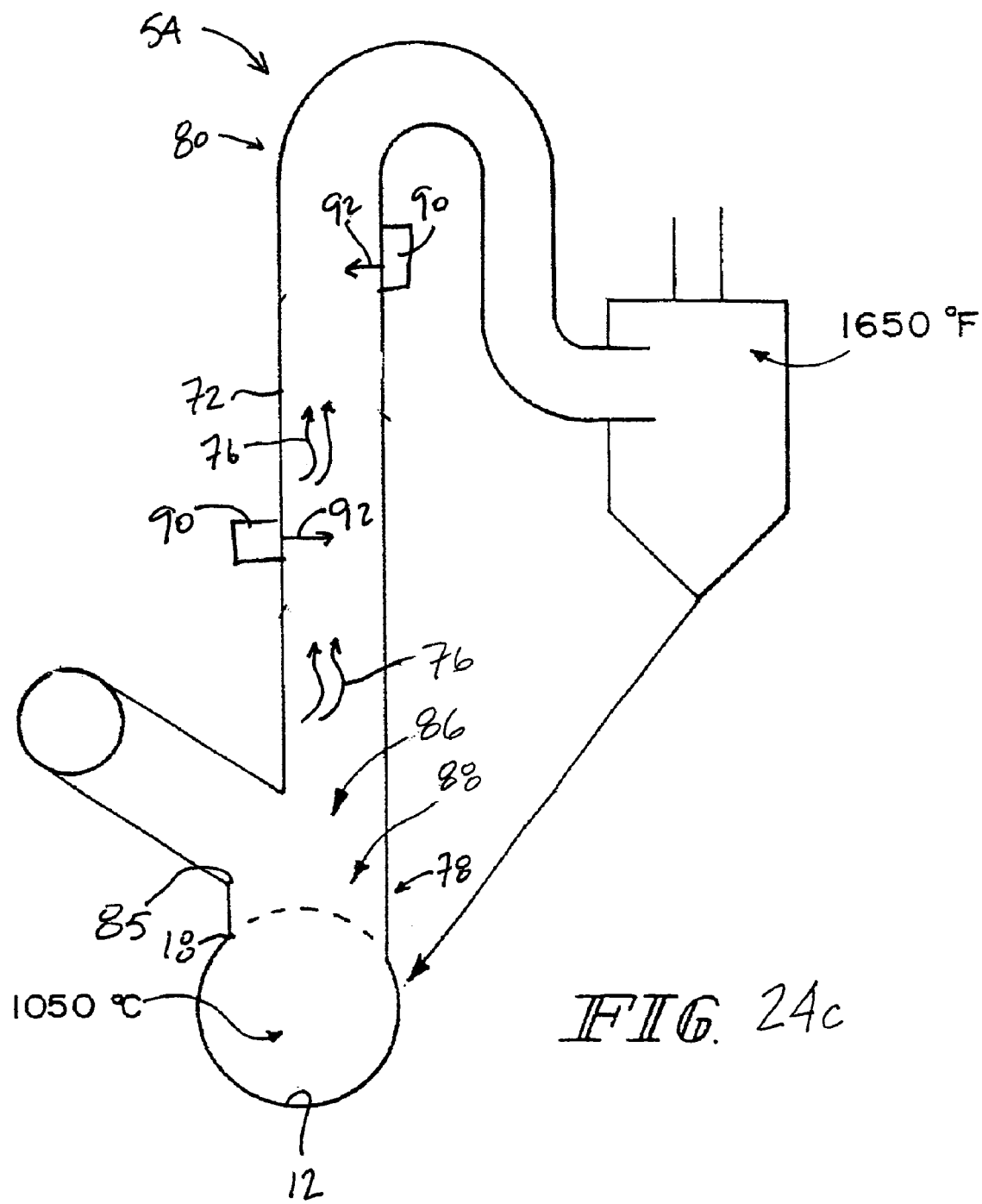

Turning to FIG. 24c, the injectors 90 may also be positioned, with respect to the flow direction of the kiln gas stream 76, downstream of the fuel inlet 86 and feed assembly 88. As such, the injectors 90 are positioned above the fuel inlet 86 and the feed assembly 88. The injectors 90 may introduce the high pressure air 92 at a position downstream of the fuel inlet 86 and feed assembly 88. Although two injectors 90 are shown in FIG. 24c, it should be appreciated that only a single injector 90 may be used. Conversely, more than two injectors may also be used.

Figure 24D:
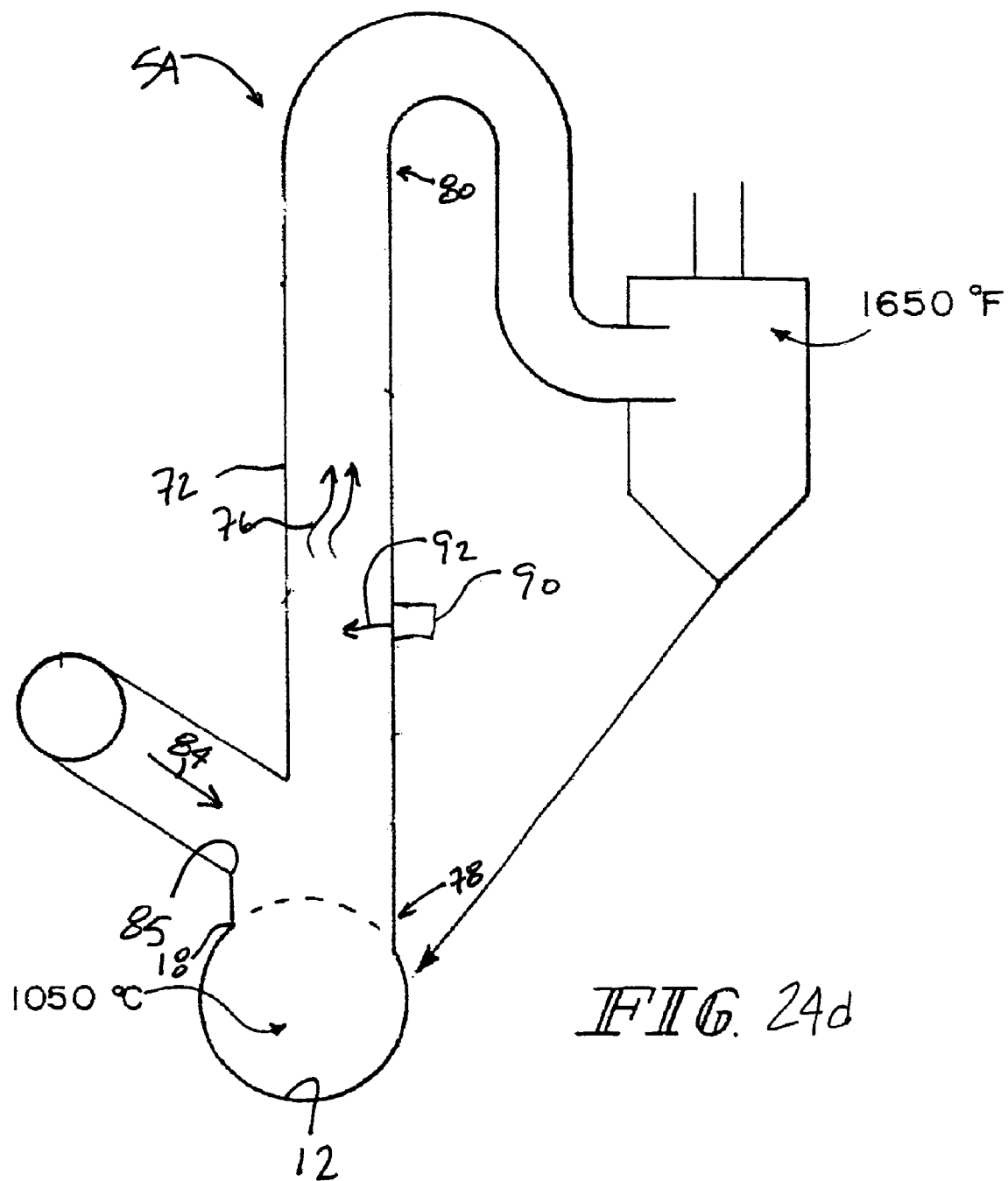
Figure 25:
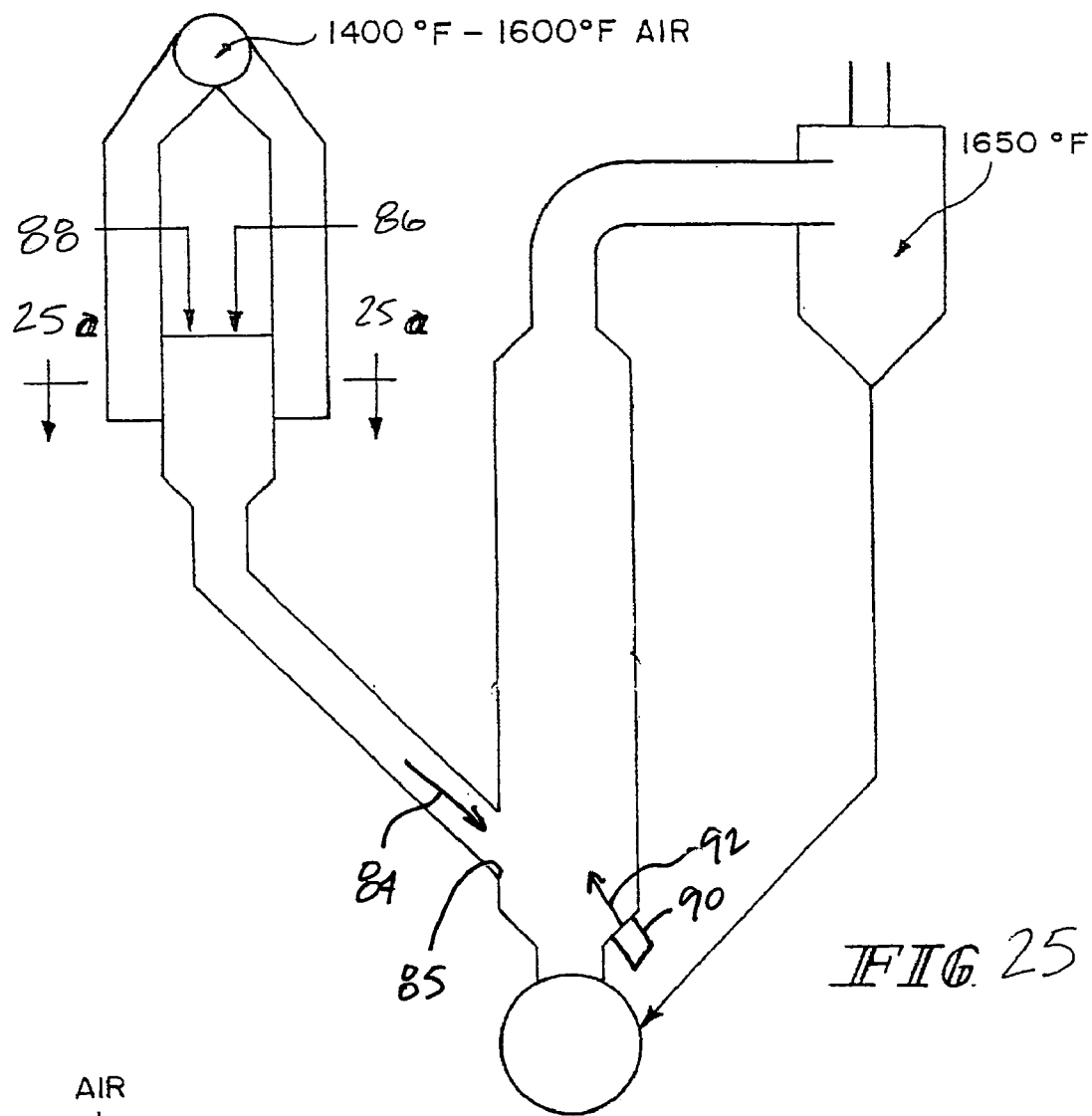
Figure 25A:
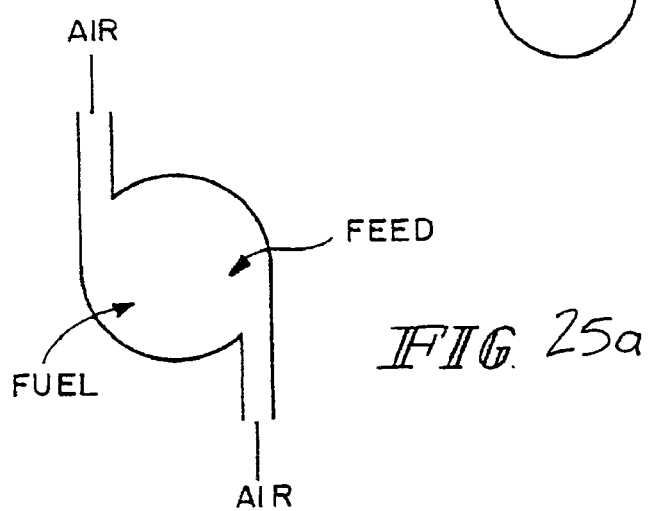

As shown in FIG. 24d, with respect to the flow direction of the kiln gas stream 76 through the stationary vessel 72, the injector 90 may be positioned downstream of the inlet 85 of the tertiary air 84 into the stationary vessel 72. As such, the injector 90 is positioned above the inlet 85. In such a way, the injector 90 introduces the high pressure air 92 at a position downstream of the inlet 85 of the tertiary air 84. As shown in FIG. 25, the injector 90 may be positioned opposite the inlet 85 of the tertiary air 84 in order to introduce the high pressure 92 to impart momentum to the tertiary air 84. It should be appreciated that although only a single injector 90 is shown in the embodiments of FIG. 24d and FIG. 25, any number of injectors may be used.

Figure 26A:
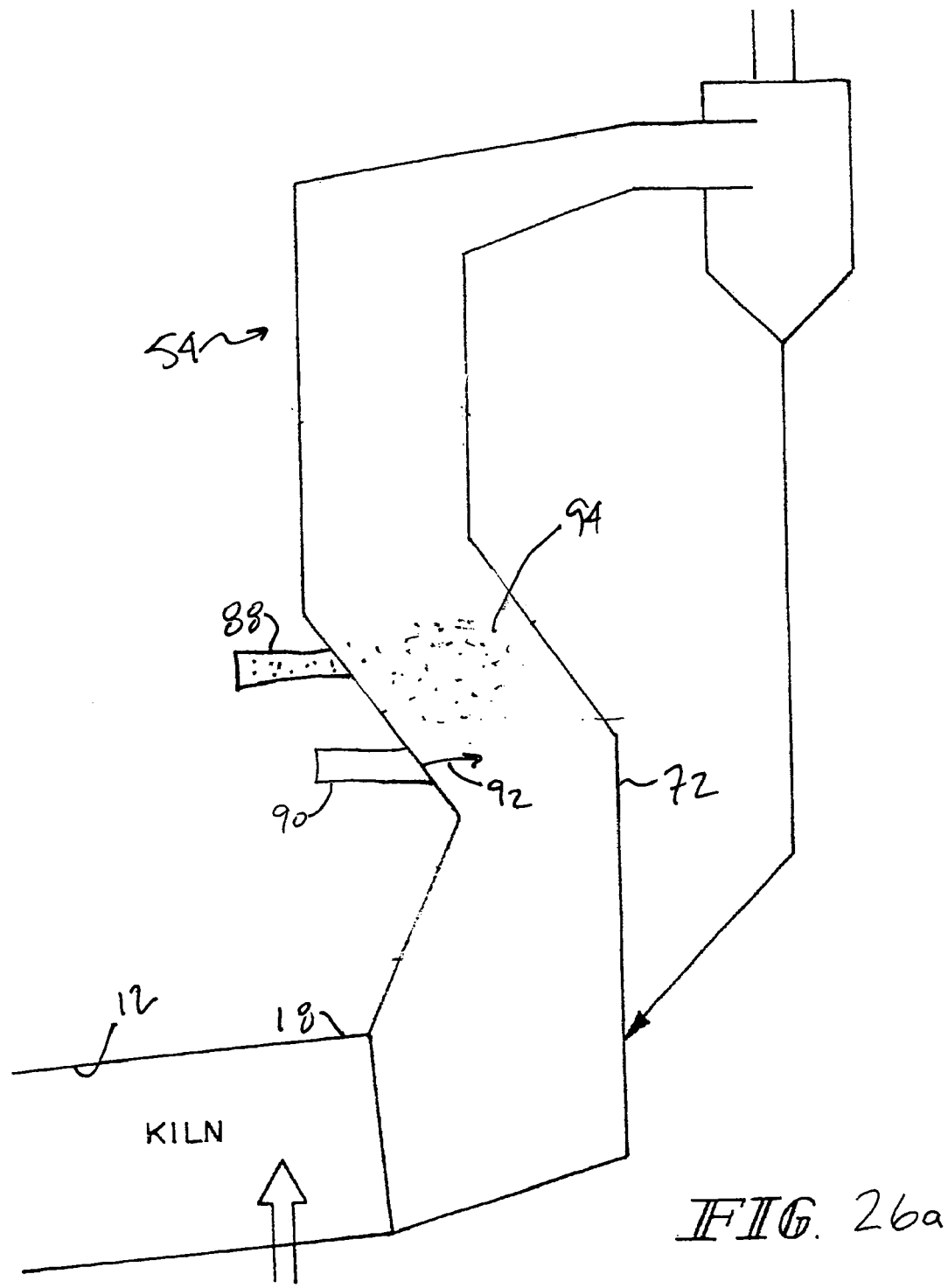

Turning to FIG. 26a, the feed assembly 88 is coupled to the stationary portion 54 to advance feed 94 such as mineral from the stationary portion 54 through the stationary vessel 72 and into the upper end 18 of the rotary vessel 12. With respect to the flow direction of the feed 94 through the stationary vessel 72, the injector 90 may be positioned downstream from the feed assembly 88. In this embodiment, the injector 90 introduces the quantity of high pressure air 92 to impart momentum to the feed 94 to facilitate mixing of the feed 94 with the kiln gas stream as the feed 94 exits the feed assembly 88. Accordingly, the injector 90 introduces the quantity of high pressure air 92 downstream of the feed 94 as the feed 94 advances from the stationary portion 54 to the upper end 18 of the rotary vessel 12. It should be appreciated that although only a single injector 90 is shown in FIG. 26a, any number of injectors may be used.

Figure 26B:
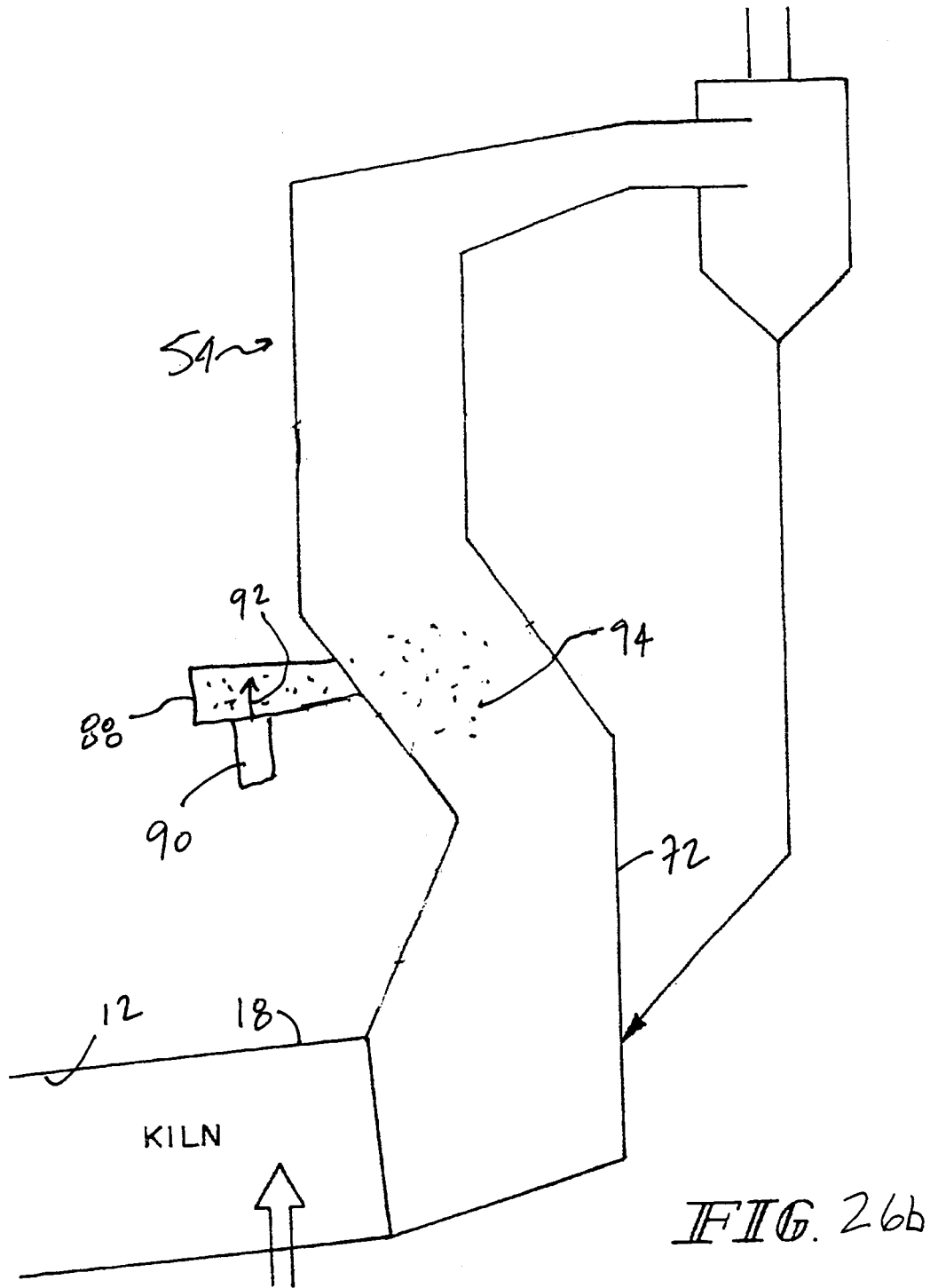

As shown in FIG. 26b, the injector 90 may be positioned within the feed assembly 88 in order to impart momentum via the high pressure air 92 to the feed 94 as the feed 94 travels through the feed assembly 88 and into the stationary vessel 72. It should be appreciated that although only a single injector 90 is shown in FIG. 26b, any number of injectors may be used.

Figure 27:
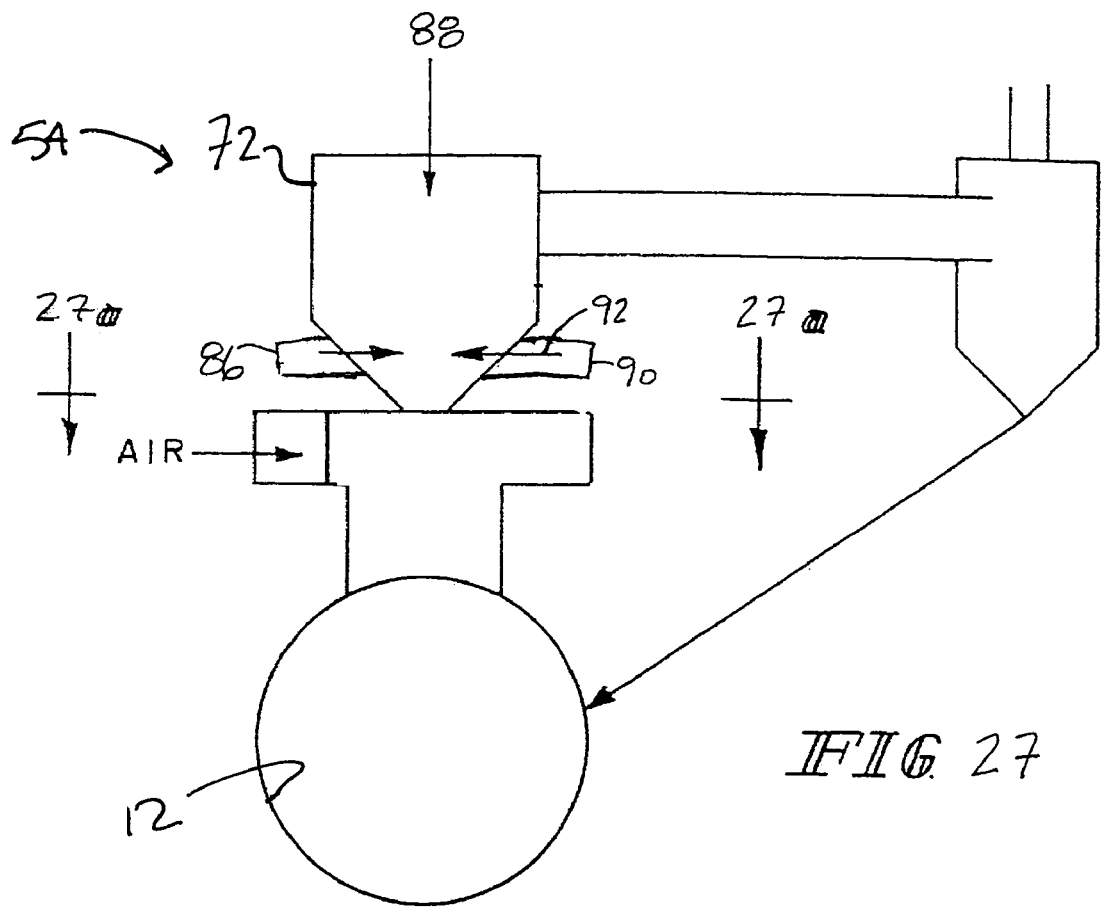
Figure 27A:
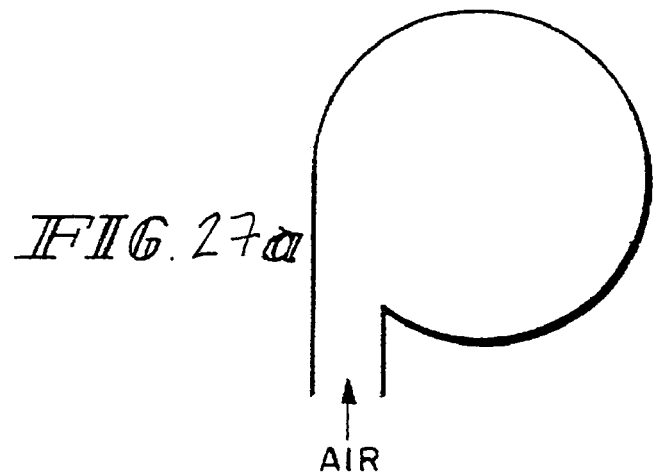

Turning to FIG. 27, the injector 90 may be positioned opposite the feed inlet 86. In this embodiment, the injector 90 introduces high pressure air 92 to impart momentum to the fuel to facilitate mixing of the fuel as it exits the fuel inlet 86. Although only a single injector 90 is shown in FIG. 27, any number of injectors may be used.

Regardless of the configuration of the stationary portion 54 and the placement of the injectors 90, the injectors 90 introduce the quantity of high pressure air 92 into the stationary vessel 72 to facilitate cross sectional mixing of the kiln gas streams 76 and/or the feed 94. As such, the injectors 90 introduce the quantity of high pressure air 92 to promote mixing flow such as turbulent, rotational or cyclonic flow in the stationary vessel 72.

EXAMPLE 1

Staged Combustion Lime Kiln

Staged combustion can be accomplished by several means. For example, a kiln is operating with about zero to five percent of the air in excess of what is required for combustion. At this level of excess air, some residual carbon monoxide, and sulfur dioxide are produced. Further reduction of excess air to the combustion zone to reduce formation of nitrogen oxides would result in an undesirable emission of carbon monoxide and sulfur dioxide and the loss of thermal efficiency due to incomplete combustion of the fuel. By installing the apparatus of the invention and injection 10% of the total combustion air to the process, the available air in the primary combustion zone would be insufficient to completely combust the fuel, and the gases leaving this zone would have significant concentrations of carbon monoxide and other species that are products of incomplete combustion. Nitrogen oxides are reduced even though the primary combustion zone remains at high temperature since the products of incomplete combustion preferentially draw the available oxygen or can even draw the oxygen from nitrogen oxide.

Since the total air flow remain is at 100–105% of that needed for combustion, the injection of 10% at mid-kiln results in only 90–95% of the required combustion air in the primary combustion zone. The additional air is injected at a temperature zone of the kiln where it is still sufficiently hot enough to rapidly complete combustion when available oxygen becomes available yet not so hot as to form nitrogen oxides. The 10% of combustion air is injected with sufficient energy to mix the cross-section of combustion gas in the kiln. This results in 0–5% air in excess of that required for combustion, which will minimize residual carbon monoxide and sulfur dioxide. This mixing zone is not at as high of temperature as the primary combustion zone, therefore, nitrogen oxides are not formed even though there is now excess oxygen in this zone.

EXAMPLE 2

The use of mixing air for improving the efficiency of combustion is described in U.S. Pat. No. 5,632,616, which claims the use of mixing air in conjunction with mid-kiln firing. The use of tangential injection of high energy air to create a rotational component of the bulk gas in the kiln enhances mixing air efficacy when the injection occurs upstream (downhill) of the fuel injection point.

EXAMPLE 3

The mixing air concept was developed as a result of the identification of the stratification of gases in the kiln. The heaver carbon dioxide and the pyrolysis gases form the mid-kiln fuel will remain stratified on the bottom of the kiln and the high temperature gases containing oxygen are stratified at the top.

The cross-sectional mixing obtained by the method of injection of the mixing air allows burn-out of the residual products of incomplete combustion when the device is placed downstream (uphill) of the fuel injection point. For nitrogen oxide reduction, it is essential to also get cross-sectional mixing of the gases when they are still depleted in oxygen. Therefore, a mixing air system is installed upstream (downhill) from the mid-kiln firing point to impart a rotational momentum to the kiln gases to mix the plume of the combusting and pyrolyzing fuel throughout the kiln gases.

The ideal kiln system would have been two air injection systems, one upstream of the mid-kiln fuel injection to get cross-sectional mixing while the kiln gases are still depleted in oxygen, and another downstream to get cross-sectional mixing with the injected air to get burn-out of any residual products of incomplete combustion.

The examples suggest that the combustion air is 5% less than that sufficient to complete combustion in the reducing zone. In practice, it would be expected that achieving only 1 or 2% deficiency in combustion air would suffice in controlling nitrogen oxide emissions.

EXAMPLE 4

The use of a small quantity of high-pressure air injected to enhance mixing can also be applied to precalciner cement kilns. Precalciner cement kilns use secondary firing and can be modified to introduce some combustion air after the secondary firing zone to create staged combustion. However, such modifications are costly. Also, because of the power required to move the combustion gases through a precalciner kiln, these systems are designed to operate with low pressure drops. Thus, the systems are not designed to optimize mixing and use long retention times to get adequate mixing. The performance of these kiln systems could be enhanced by introducing energy by means of very high velocity (pressure) mixing air. Pressures of about 4 to about 150, more typically about 40 to 100 psi could be used to introduce significant amounts of energy to create good mixing in a short time. With the very high pressures, the energy introduction can be achieved with only a few percent of the total combustion air (1% to 5%). Hundreds of horsepower of energy could be put into mixing without increasing the overall pressure drop of the precalciner system. The quantities of air required are kept limited in order to minimize the quantity of air displaced from the heat recuperator. Increasing the mixing efficiency can increase combustion efficiency and allow the reduction in excess air required to get the desired levels of residual carbon monoxide. This reduction in excess air overall, and the excess air reduced by the substitution after the primary combustion zone results in less oxygen available in the combustion zone which will favorably minimize nitrogen oxide formation. With increasing mixing air substitution, the primary combustion zone could become substoichiometric resulting in an atmosphere that favorably destroys nitrogen oxides produced in the high temperature rotary kiln and pass through the precalciner.

Effect of Mixing Air on the Process

The gases inside a calcining kiln are highly stratified due to the temperature and resulting density differences between the combustion gases and the gases being liberated from the in-process mineral. As a result there is no direct contact of the hot combustion gases with the mineral bed. Heat transfer occurs indirectly by the hot gases heating the kiln walls and the hot walls are rotated under the mineral bed as the kiln turns. There may also be radiation from the hot gases to the mineral bed, but this mechanism becomes minor as the combustion gas cool from the peak temperatures in the primary combustion zone. The injection of high pressure air in a manner that imparts a rotational momentum to the kiln gases will add another mechanism of heat transfer to the calcining kiln as it will bring the hot combustion gases that were traveling along the top of the kiln down into contact with the mineral bed. This additional heat transfer mechanism will serve to improve the thermal efficiency of the calcining device.

The injection of ambient air into the kiln at mid-process displaces air that comes from the heat recuperator that recovers heat in the discharged product into the combustion air. The reduction in air from the heat recuperator may affect the efficiency of this heat recuperation, therefore it is desirable to minimize the amount of mixing air added mid-process. This requires that the mixing air be injected at high pressure so that it has sufficient kinetic energy to impart a rotational component to the bulk kiln gases.

Fuel Penalty of High Energy Air Jets on a Precalciner Kiln

It is commonly believed that injections of unheated air into the cement process downstream of the cooler and the resulting displacement of air from the cooler will result in unacceptable loss of heat recovery. On closer examination calculations reveal that such loss of heat recovery is minimal, especially in view of the benefits of mixing the process gases in high temperature zones. Calculations show that if 10% of the theoretical combustion air is introduced with high energy into the rotary kiln, the displacement of a corresponding mass of preheated air would result in a reduction of the heat recovery from the cooler of less than 2% of the total energy input. The potential gain in process efficiency due to elimination of stratification can more than offset this heat loss.

Burning of Tires in a Precalciner Kiln

Whole tires can be introduced onto the feed chute or dropped with enough momentum that they roll into the upper end of the rotary vessel kiln. The firing rate of tires in a secondary burning zone at the upper end of the rotary vessel of a precalciner kiln is limited by the requirement to reduce the fuel at the main burner by a corresponding amount. The resulting increase in the air-to-fuel ratio results in a cooling of the main flame and inadequate flame temperatures occur at about a 20% substitution rate. Other problems occur as a result of the stratification of gases in the kiln exit. The tires lie at the bottom of the kiln vessel where there is inadequate oxygen to complete combustion. As a result, combustible rich gas enters the inlet chamber above the feed shelf where some mixing occurs with the oxygen containing gases from the top of the kiln. The resulting combustion in the inlet chamber creates localized high temperatures and results in unacceptable buildups in the inlet chamber.

With the use of high energy air jets introducing up to about 10% of the combustion air with a rotational momentum near the upper end of the rotary vessel, the substitution rate of the whole tires can be increased to 30% of the kiln fuel without unacceptable main flame temperature or buildups. Further, the air-jet mixing produces a more uniform distribution of the reduced oxygen gases created by the burning tires to promote more effective $NO_x$ reduction. The improvement in the mixing of the kiln gases minimizes the potential for unacceptable buildup in the inlet chamber.

Polysius Fuel Injection at Precalciner Exit to Control $NO_x$

One method of destroying $NO_x$ generated in the high temperature zone of a mineral processing kiln is to produce a substoichiometric zone at a temperature of 1800° to 2500° F. at some point downstream. This can be conveniently done by introducing a hydrocarbon fuel at the kiln exit as described by Polysius. A limitation of this technique is the fact that the exit gases of the kiln are highly stratified. The gases at the top of the kiln are hotter and higher in oxygen content, and the gas traveling along the bottom of the kiln is cooler and enriched with the carbon dioxide from the residual calcium carbonate in the hot mean entering the kiln and possibly rich with carbon monoxide from any carbon introduced from the precalciner.

The function of the injected fuel can be enhanced by achieving a uniform distribution of the reducing zone on the cross-section of the duct. By injecting mixing energy by the means of air jets in the rotary kiln to break up the stratification in the rotary kiln provides a more uniform gas composition to the reducing zone. Further mixing of the injected fuel and the resulting reducing zone can be achieved by use of additional high energy air injection jets in the stationery portion of the kiln proximal to the gas exit end of the rotary vessel. (See FIG. 23.)

Improvement of Heat Transfer in a Rotary Kiln

Lime Kiln Example:

The gases in the calcining zone of a lime kiln are highly stratified. In a 12' diameter kiln (11' I.D.) The gas velocity through the kiln is typically 30 to 50 feet per second, the gas temperature over the calcining limestone bed is 1800° F. to 4000° F. and the limestone bed and the released carbon dioxide (molecular weight of 44 vs. combustion gases of 29) are at the calcining temperature of 1560° F. (~850° C.). As a result of the large density difference between the hot combustion gases and the released carbon dioxide, the mineral bed remains blanketed in carbon dioxide. Heat transfer occurs by radiation and by the heated kiln wall being rotated under the mineral bed.

A high energy jet that introduces a rotational component to the kiln gas velocity results in the carbon dioxide layer being wiped off the calcining material. This allows direct contact of the hot combustion gases with the mineral bed. Because of the greater surface area now available and the greater temperature differences between the combustion gases and the in-process mineral (as compared to the kiln wall) heat transfer rate is increased.

These high energy jets break up the stratification that was formed and the rotational component induced by the jets prevents the reformation of the stratified layer.

By bringing the hot, oxygen containing kiln gases in contact with the mineral bed, combustible components in the bed that were previously blanketed with carbon dioxide are now able to combust. These combustible components can be naturally occurring in the mineral being processed, or be a result of solid fuel introduced to provide energy for the process.

There are many benefits that can be gained by the process by breaking up the stratification that is inherent with mineral beds in rotary kilns.

Early Mixing Air Application—$NO_x$ Reduction and Destruction by Air Injection Downstream from Secondary Burning Zone $NO_x$ reduction in a long wet or long dry cement kiln has been successfully accomplished using a mid-kiln secondary burning zone. About 10 years ago the mid-kiln fuel injection technology was pioneered to allow a cement kiln to burn energy-bearing solid waste materials such as whole tires.

One of the side benefits of that technology was an approximate 30% reduction in $NO_x$ emissions.

$NO_x$ emissions are the result of the combustion process used to produce cement. The high temperatures and oxidizing conditions required to make cement also form nitrogen oxides. Consequently, while the kiln is running it will produce some level of $NO_x$. The level of $NO_x$ formed is dependent on many factors, but it is predictable. Within each kiln, increases and decreases in the $NO_x$ emission levels are typically related to the rise and fall in the temperature of the burning zone. The majority at $NO_x$ is formed from one of two different mechanisms within the burning zone. The first is high temperature oxidation of atmospheric nitrogen, and the second is the oxidation of nitrogen-bearing compounds in the fuel. Most of the $NO_x$ emissions from a cement kiln are thermal $NO_x$. In general, thermal $NO_x$ is formed by the direct oxidation of atmospheric nitrogen at very high temperatures. This reaction is very sensitive to temperature. As the temperature increases, so does the rate of reaction. The second source of $NO_x$ emissions are nitrogen containing compounds in fuel. Typical coal contains approximately 1.5% nitrogen by weight. These compounds undergo a complex series of reactions, which result in a portion of this nitrogen being converted into $NO_x$. This set of reactions is consistent throughout the combustion process and is relatively unaffected by temperature. Fuel-rich flames tend to decrease the production of fuel $NO_x$, and oxygen-rich flames tend to increase or favor fuel $NO_x$ production. In the burning zone of a kiln where oxidizing conditions are required for proper clinker mineralogy, the combustion process favors the production of fuel $NO_x$. There are some other mechanisms that produce $NO_x$. Normally their effects are relatively insignificant compared to thermal and fuel $NO_x$.

Mid-kiln fuel injection system has a proven history of providing significant $NO_x$ reduction in a long wet or long dry cement kiln. It takes advantage of recognized technology of staged combustion, in that a portion of the fuel is burned in a secondary combustion zone that is near the middle of the long wet or long dry kiln. After studying the effects of mid-kiln fuel injection on a cement kiln, it has been determined that it has a direct effect on the thermal $NO_x$ formation mechanism. It lowers the peak flame temperature, which decreases the $NO_x$ emission rate and in addition, there is the opportunity for re-burn of $NO_x$ created in the high temperature zone of the kiln, in the lower temperature secondary combustion zone.

In this invention, injection of approximately 10% of the total combustion air through a nozzle, preferably one having an orifice with an aspect ratio of greater than one, into the kiln downstream of the secondary burning zone. At high velocity (from a pressurizing source capable of providing a static pressure differential of at least 0.15 atm, more preferably at least 0.20 atm) and at an angle to the kiln gas flow to impart a rotational component to the kiln gases. This rotational component provides much better cross-sectional mixing in the kiln. By mixing the kiln gases, improved combustion and lower emissions are produced. The mixing air injection affects $NO_x$ by changing the dynamics of airflow within the kiln. By adding the mixing air into the airflow downstream of the mid-kiln fuel entry point, the amount of excess air between the main flame and the mixing air fan can be altered. In this example, the mid-kiln fuel now uses the remaining excess air after the primary burner, and by the mid-kiln fuel entry point, there is no excess air in the kiln. This situation now provides the opportunity for chemical de-$NO_x$. The mixing air then adds 10% excess air back into the kiln, and provides an opportunity for oxidizing re-burn of the residual products of incomplete combustion.

The invention claimed is:

1. A method of operating a preheater/precalciner kiln having an inclined rotary vessel and a stationary portion coupled with the inclined rotary vessel wherein a stream of kiln gas flows in a direction from the inclined rotary vessel and through the stationary portion, the method comprising the steps of:
   advancing mineral from the stationary portion into an upper end of the inclined rotary vessel;
   advancing mineral from the upper end of the inclined rotary vessel to a lower end of the inclined rotary vessel;
   introducing a quantity of combustion air and combustible fuel through the lower end of the inclined rotary vessel; and
   introducing a quantity of high pressure air into the stationary portion wherein the quantity of high pressure air imparts momentum on the stream of kiln gas at a ratio of between 2 and 20 kg*m/sec per kg of gas and solids entering the stationary portion.

2. The method of claim 1, wherein introducing the quantity of high pressure air into the stationary portion comprises imparting momentum on the stream of kiln gas at a ratio of between 4 and 10 kg*m/sec per kg of gas and solids entering the stationary portion.

3. The method of claim 1, wherein introducing the quantity of high pressure air into the stationary portion comprises introducing the quantity of high pressure air in a direction which is substantially perpendicular to the flow direction of the stream of kiln gas.

4. The method of claim 1, wherein introducing the quantity of high pressure air into the stationary portion comprises introducing the quantity of high pressure air at a position which is downstream of a location in which mineral is introduced into the stationary portion.

5. The method of claim 1, wherein introducing the quantity of high pressure air into the stationary portion comprises introducing a quantity of high pressure unheated air.

6. The method of claim 1, wherein introducing the quantity of high pressure air into the stationary portion comprises introducing the quantity of high pressure air at a mass flow rate of about 1% to about 5% of the total mass flow rate of gas and solids entering the stationary portion.

7. The method of claim 1, wherein introducing the quantity of high pressure air into the stationary portion comprises introducing the quantity of high pressure air at a mass flow rate of about 2% of the total mass flow rate of gas and solids entering the stationary portion.

8. The method of claim 1, wherein the step of introducing the high pressure air into the stationary portion comprises introducing the high pressure air at a pressure of about 2 psi to about 100 psi.

9. The method of claim 1, wherein the step of introducing the high pressure air into the stationary portion comprises introducing the high pressure air at a pressure of about 2 psi to about 15 psi.

10. The method of claim 1, wherein the step of introducing the high pressure air into the stationary portion comprises introducing the high pressure air at a pressure of about 6 psi to about 12 psi.

11. The method of claim 1, wherein the step of introducing the quantity of high pressure air into the stationary portion comprises introducing the quantity of high pressure air at a pressure of about 6 psi.

12. A method of operating a kiln having an inclined rotary vessel and a stationary portion coupled with the inclined rotary vessel wherein a stream of kiln gas flows in a direction from the inclined rotary vessel and through the stationary portion, the method comprising the steps of:
- advancing mineral from the stationary portion into an upper end of the inclined rotary vessel;
- advancing mineral from the upper end of the inclined rotary vessel to a lower end of the inclined rotary vessel;
- introducing combustion air and combustible fuel through the lower end of the inclined rotary vessel; and
- introducing a quantity of high pressure air into the stationary portion at a mass flow rate of about 1% to about 5% of the total mass flow rate of gas and solids entering the stationary portion to impart momentum to the stream of kiln gas stream flowing through the stationary portion.

13. The method of claim 12, wherein introducing the quantity of high pressure air into the stationary portion comprises introducing the quantity of high pressure air at a mass flow rate of about 2% of the total mass flow rate of gas and solids entering the stationary portion.

14. The method of claim 12, wherein the step of introducing the high pressure air into the stationary portion comprises introducing the high pressure air at a pressure of about 2 psi to about 100 psi.

15. The method of claim 12, wherein the step of introducing the high pressure air into the stationary portion comprises introducing the high pressure air at a pressure of about 2 psi to about 15 psi.

16. The method of claim 12, wherein the step of introducing the high pressure air into the stationary portion comprises introducing the high pressure air at a pressure of about 6 psi to about 12 psi.

17. The method of claim 12, wherein the step of introducing the quantity of high pressure air into the stationary portion comprises introducing the quantity of high pressure air at a pressure of about 6 psi.

* * * * *